(12) United States Patent
Bauver et al.

(10) Patent No.: US 6,811,358 B2
(45) Date of Patent: Nov. 2, 2004

(54) ADJUSTABLE FLOW VECTORING SPLITTER

(75) Inventors: Wesley P. Bauver, Granville, MA (US); Brian P. DeMarey, Bondsville, MA (US); William R. Hocking, Somers, CT (US); Xavier R. Ollat, Tolland, CT (US)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/084,902

(22) Filed: Feb. 27, 2002

(65) Prior Publication Data

US 2003/0161694 A1 Aug. 28, 2003

(51) Int. Cl.[7] .............................................. B65G 51/24
(52) U.S. Cl. ...................... 406/182; 406/113; 406/195; 406/181; 406/183
(58) Field of Search ................................ 406/113, 192, 406/195, 181–183, 86, 127, 132, 133; 209/147; 110/309, 310

(56) References Cited

U.S. PATENT DOCUMENTS

| | | | | |
|---|---|---|---|---|
| 3,267,891 A | * | 8/1966 | Hemker ...................... 110/232 |
| 3,367,603 A | * | 2/1968 | Feyerherd ................... 406/182 |
| 3,489,178 A | * | 1/1970 | Kice .......................... 406/183 |
| 3,762,664 A | * | 10/1973 | Loveless ..................... 406/182 |
| 4,051,791 A | * | 10/1977 | Wormser .................... 110/264 |
| 4,807,662 A | * | 2/1989 | Verne ........................ 137/554 |
| 5,842,426 A | * | 12/1998 | Ohta et al. ................. 110/261 |
| 5,960,723 A | * | 10/1999 | Vierstra et al. ............ 110/297 |
| 5,979,343 A | * | 11/1999 | Gregor et al. ............. 111/175 |
| 6,105,516 A | * | 8/2000 | Bowen ....................... 110/261 |
| 6,120,211 A | * | 9/2000 | Raike ......................... 405/79 |

* cited by examiner

*Primary Examiner*—Richard Ridley
(74) *Attorney, Agent, or Firm*—Russell W. Warnock

(57) ABSTRACT

A material feed apparatus 34 for influencing the travel properties of a feed stream of material 42 moving between a pulverizer 14 and a furnace 12 includes a feed path 36 passing through an upstream passage periphery UPZ. The feed path 36 includes one duct 44A having a branch entry 66A and another branch duct 44C having a branch entry 66C both downstream of the upstream passage periphery UPZ through which the feed stream of the material 42 travels in two segregated portions. A Y-axis drive assembly 58 and the X-axis drive assembly 62 move the nozzle 52 relative to the reference axis RA, whereupon the upstream passage periphery UPZ moves relative to the reference axis RA such that the travel properties of the one portion of material in the one branch duct 44A are different than its travel properties before the movement of the upstream passage periphery UPZ.

11 Claims, 18 Drawing Sheets

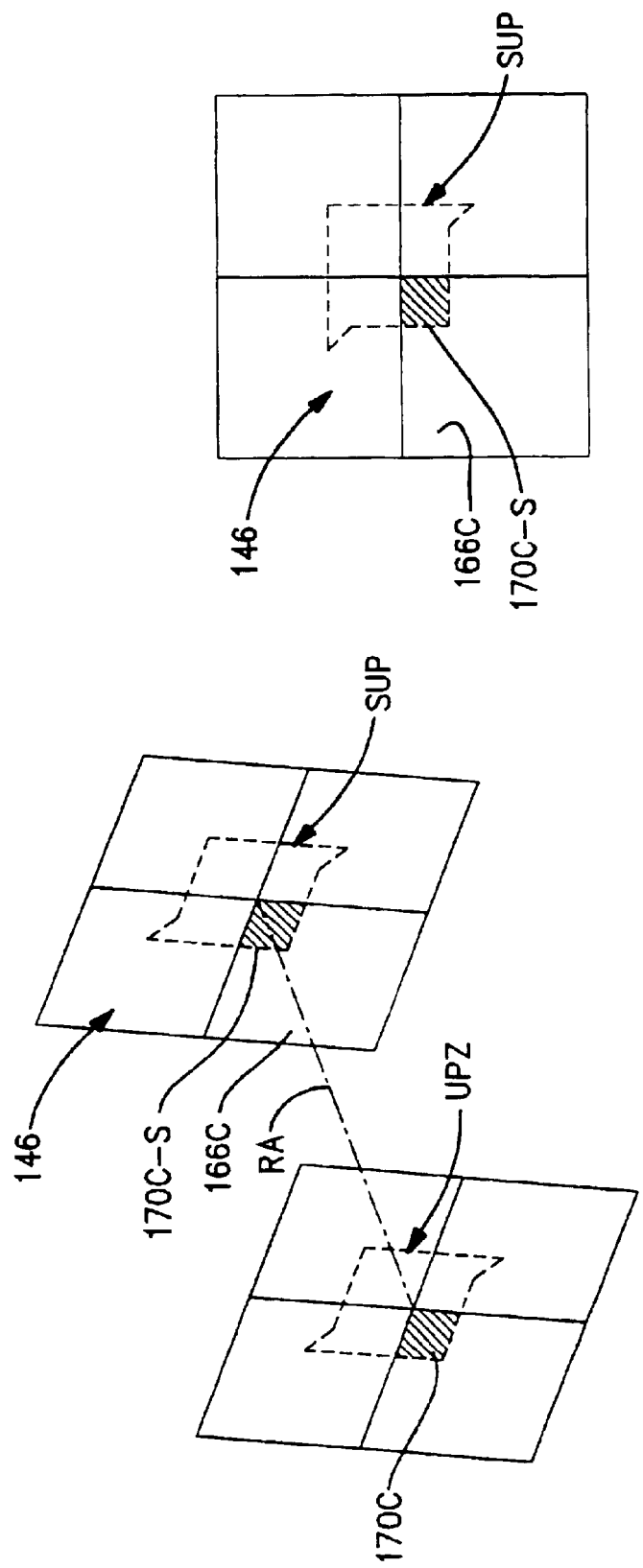

ADJUSTABLE FLOW VECTORING SPLITTER

BACKGROUND OF THE INVENTION

The present invention relates to a material feed apparatus for the feed of material between a material supply location and a delivery location and, more particularly, to a material feed apparatus for use with fossil fuel delivery systems including the coal piping for delivering pulverized coal to coal fired steam generators.

Coal fired furnaces are typically provided with a plurality of ducts or pipes through which pulverized coal and air is directed to a plurality of fuel-air admission assemblies arrayed in respective vertically extending windboxes. The windboxes are disposed in one or more walls of the furnace and each introduces coal and air into the furnace.

Pulverized coal firing is favored over other methods of burning coal because pulverized coal burns like gas and, therefore, fires are easily lighted and controlled. Such systems may include one or more pulverizers, also referred to as mills, that are used to grind or comminute the fuel or, alternatively, may not include any pulverizer because a supply of pulverized coal available.

The pipes directing the coal to the respective windboxes are large and cumbersome. Typically the pipes are provided with large couplings or bolted flanges to couple the end abutting axially adjacent portions together. The normal nozzle assembly requires regular maintenance because the pulverized coal has a severe erosive effect. A typical pulverizer will move between 7 and 50 tons of coal every hour. The coal typically moves at a velocity of 75–90 feet per second within the fuel transport pipe.

A typical coal distribution system includes a number of distributors intended to split the flow of air and pulverized coal into two discrete pipes. It is desired that the distributors take the homogeneous mixture and deliver identical quantities of that homogeneous flow to each of the two discrete pipes. Each of these distributors is a Y-shaped duct. Each of these Y-shaped ducts has an inlet and two outlets. U.S. Pat. No. 5,934,205 to Gordon et al discloses a Y-shaped distributor body and a splitter disposed in the distributor body for dividing a flow of pulverized coal between first and second outlets.

In connection with the feed of pulverized coal to the feed burner nozzles of a combustion chamber. U.S. Pat. No. 6,055,914 to Wark notes that an exhauster fan first throws the coal radially into a primary discharge chute and that the flow of coal/air leaving the exhauster fan is uneven, whereby the coal/air flow to the burners tends to be light on one side or wall of the chute and heavy on the other side or wall of the chute in terms of both particle size and distribution.

U.S. Pat. No. 6,055,914 to Wark describes a prior art solution which involves providing "riffle boxes" in the chute between the fan and the burners. A riffle box is a series of vertical, spaced plates separated by angled separator bars with alternating orientation from plate to plate and notes that, in accordance with one theory, it is believed that the separator bars on one plate will deflect the coal in one direction, while the separator bars on adjacent plates will deflect the coal in the opposite direction, thereby splitting and redistributing the flow for a more homogeneous mixture. It is further noted in this reference that the typical arrangement is to provide a series of riffle boxes, with a first riffle box splitting the flow like a "Y" into two chute branches, and a subsequent riffle box on each of the first two branches splitting the flow again into a total of four chutes. Each chute typically fuels one of four corner-mounted burners in a tangentially-fired combustion chamber.

U.S. Pat. No. 6,055,914 to Wark notes that the riffle boxes have proven ineffective in providing a more homogeneous mixture to the burners, and the coal/air flow reaching the four combustion chamber burners differs significantly from burner to burner. The reference cites several problems which result from a riffle box arrangement: too lean a mixture at a burner can create NOX: oversized particles and inefficient burning create LOI (loss on ignition) contamination of the ash byproduct and reduced combustion efficiency: and, perhaps most importantly, the out-of-balance burner flow distorts the combustion chamber fireball from the ideal spherical shape to an undesirable elliptical shape, creating hot and cold spots in the boiler tubes and causing gas control problems.

SUMMARY OF THE INVENTION

It is an object of the present invention to provide a moving fluid distributor apparatus which will be more durable.

Another object of the invention is to provide an apparatus for feeding material between a material supply location and a delivery location which permits more precise and reliable control of the distribution of the material between two or more branch feed paths.

A further object of the present invention is to provide an apparatus for feeding material between a material supply location and a delivery location which distributes material between two or more branch feed paths in a manner which minimizes any loss of pressure.

An additional object of the present invention is to provide an apparatus for feeding material between a material supply location and a delivery location which distributes a mixture comprised of a fluid transport material and a solid material between two or more branch feed paths in a manner in which the distribution of the fluid transport material between the branch feed paths remains substantially the same following a re-distribution of the entrained solid material between the branch paths.

In accordance with one aspect of the present invention, it has now been found that these and other objects of the invention may be attained in an apparatus for influencing the travel properties of a material moving between a material supply source and a delivery location which includes means forming a feed path along which material travels as the material is enroute from the material supply source to the delivery location and means for moving at least one of the upstream passage periphery and the one branch entry relative to a reference axis. In accordance with further details of the one aspect of the present invention, the feed path passes through an upstream passage bounded by an upstream passage periphery each point of which is at a predetermined radial spacing from the reference axis and the feed path including one branch having a branch entry downstream of the upstream passage and another branch having a branch entry downstream of the upstream passage. The stream of material travels through the upstream passage thereafter separating into at least two portions with one portion of the material entering the one branch through its branch entry and thereafter traveling along the one branch and another portion of the material entering the another branch through its branch entry and thereafter traveling along the another branch in a manner in which the another portion of the material and the one portion of the material are segregated from one another during their respective travel along the one branch and the another branch. Also, the means for moving at least one of the upstream passage periphery and the one branch entry relative to the reference axis moves the at least one of the upstream passage periphery and the one branch entry relative to the reference axis such that the one portion of the material and the another portion of the material, prior to their respective segregated travel along the one branch and the another branch, are comprised in unseparated manner in the stream of material as it travels through the upstream passage and the portions of the material thereafter travel in segregated manner in their respective branches with the travel properties of the one portion of the material in the one branch being different than its travel properties before the movement of the at least one of the upstream passage periphery and the one branch entry relative to the reference axis.

According to another aspect of the present invention, the material feed apparatus is configured for cooperation with an associated furnace having the capability of burning coal which is delivered thereto as a mixture of pulverized coal and air.

BRIEF DESCRIPTION OF THE DRAWINGS

FIG. 11 is a perspective schematic view of the upstream passage periphery in its initial upstream position shown in FIG. 10 and showing the superimposition of the upstream passage periphery on the branch entries formed by the manifold of the further embodiment of the material feed apparatus of the present invention;

FIG. 12 is a front plan schematic view of the superimposition of the upstream passage periphery on the branch entries formed by the manifold shown in FIG. 11;

DETAILED DESCRIPTION OF THE PREFERRED EMBODIMENT

Figure 1:
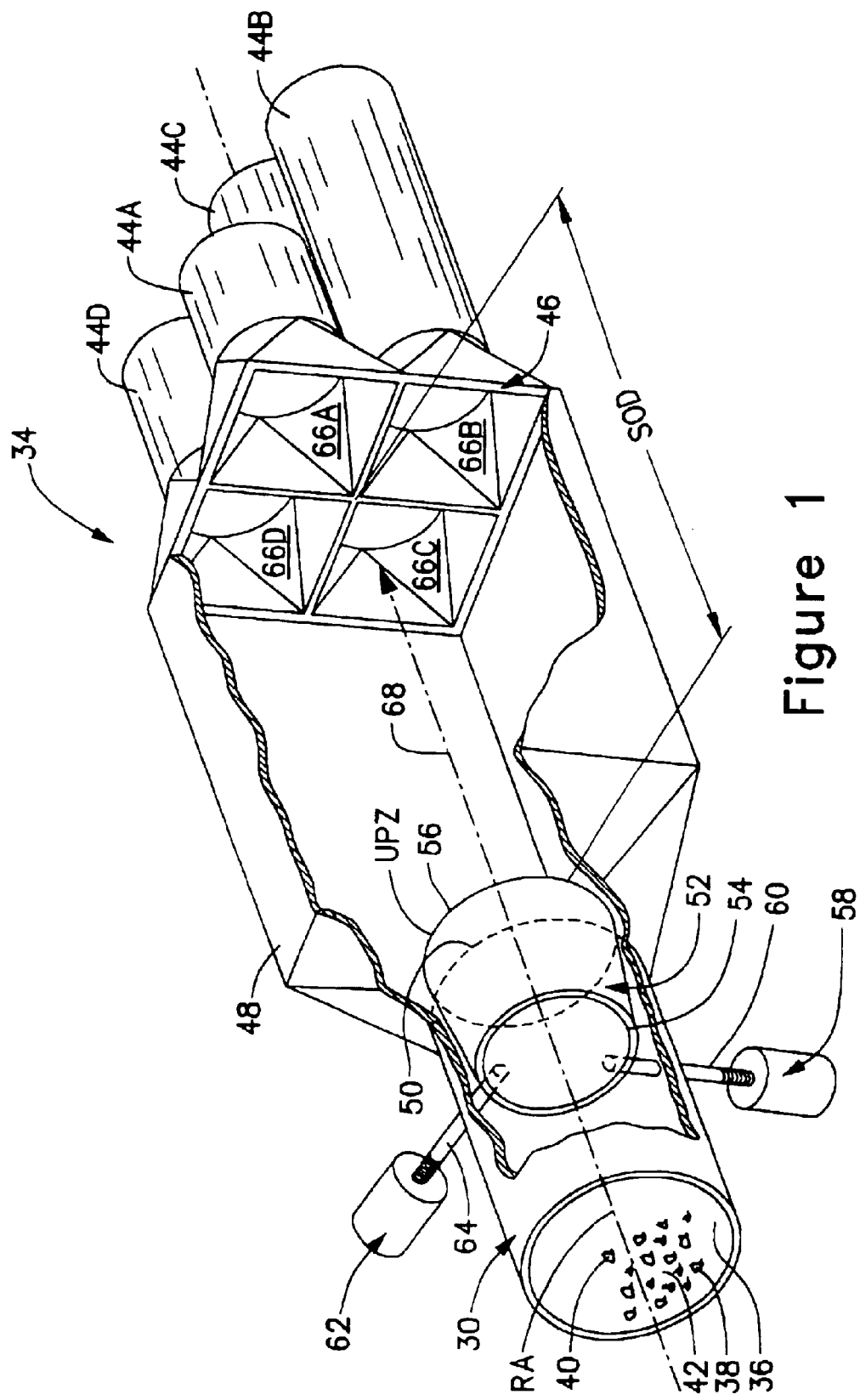
FIG. 1 is an enlarged perspective view, in partial section, of one embodiment of the material feed apparatus of the present invention shown in its installed position in line between the solid fuel pulverizer and exhauster system and furnace of the fossil fuel combustion unit shown in FIG. 26 with the upstream passage periphery thereof in an initial upstream position during an initial material feed period.

The one embodiment of the material feed apparatus of the present invention will be described in detail in connection with the operation of the one embodiment of the material feed apparatus of the present invention to deliver a pulverized solid fuel and air mixture to a combustion vessel for combustion of the pulverized solid fuel in a combustion process. However, before the one embodiment of the material feed apparatus of the present invention is described in detail, reference is had to FIG. 26 for a brief description of the components of the combustion process arrangement with which the one embodiment of the material feed apparatus of the present invention is specifically configured to operate. In the combustion process arrangement, a solid fuel pulverizer and exhauster system 10 furnishes pulverized solid fuel to a furnace 12. The solid fuel pulverizer and exhauster system 10 comprises a pulverizer 14, and an exhauster 16 for effecting delivery of a mixture of hot gases and entrained fine solid fuel particles from the pulverizer 14 to the furnace 12. The furnace 12 operates in conventional manner to combust the pulverized solid fuel and air fed thereinto and, to this end, the pulverized solid fuel and air is injected into the furnace 12 through a plurality of burners 18. Additionally, the secondary air which is required to effectuate the combustion within the furnace 12 of the pulverized solid fuel that is injected thereinto through the burners 18.

The hot cases that are produced from combustion of the pulverized solid fuel and air rise upwardly in the furnace 12. During upward movement thereof in the furnace 12, the hot gases in a manner well-known to those skilled in this art give up heat to the fluid passing through the tubes 20 that in conventional fashion line all four of the walls of the furnace 12. Then, the hot gases exit the furnace 12 through a horizontal pass which in turn leads to a rear gas pass, both gas passes commonly comprising other heat exchanger surface (not shown) for generating and super heating, steam, in a manner well-known to those skilled in this art. Thereafter, the steam commonly is made to flow to a turbine 22 which is in turn connected to a variable load, such as an electric generator (not shown), which in known fashion is cooperatively associated with the turbine 22, such that electricity is thus produced from the generator (not shown).

In a solid fuel feed operation, raw untrammeled solid fuel, which may be in the form of coal, is fed from a conventional coal storage silo 26 to the pulverizer 14 and is pulverized within the pulverizer 14. In turn, the pulverizer 14 is connected by means of an exhauster inlet duct 24 to the exhauster 16 whereby the solid fuel that is pulverized within the pulverizer 14 is entrained therewithin in an airstream and while so entrained therein is conveyed from the pulverizer 14 through the exhauster inlet duct 24 to the exhauster 16. The airstream with the pulverized solid fuel entrained therewith is made to pass through the exhauster 16 by virtue of the movement of a conventional exhauster fan assembly (not shown) rotatably mounted within the exhauster 16. The pulverized solid fuel while still entrained in the airstream is discharged from the exhauster 16 through an outlet 28. From the exhauster 16, the pulverized solid fuel entrained in the airstream is conveyed to the furnace 12 through an exhauster outlet duct 30, whereupon the pulverized solid fuel is combusted within the furnace 12. The solid fuel, which may be in the form of coal, is fed to the pulverizer 14 by a raw coal storage silo 32.

Reference is now had to FIGS. 1–6 for a more detailed description of one embodiment of the material feed apparatus of the present invention which is configured to feed a material from a material supply source to a delivery location and, more specifically, is particularly configured to feed a material in the form of a comminuted solid fossil fuel— namely, pulverized coal—from a material supply source (the pulverizer 14) to a delivery location (the furnace 12).

The one embodiment of the material feed apparatus of the present invention, which is hereinafter designated as the material feed apparatus 34, includes means forming a feed path 36 along which material in the form of pulverized coal particles 38 and air 40 is fed from a material supply source (the pulverizer 14) to a delivery location (the furnace 12). The feed path 36 comprises the various conventional components such as the exhauster 16, the exhauster inlet duct 24, the outlet 28, and the exhauster outlet duct 30 which convey the pulverized coal particles 38 and air 40, hereinafter collectively designated as the feed stream of material 42, from the pulverizer 14 to the furnace 12 as well as additional components, to be described in more detail hereinafter, which convey the feed stream of material 42 in a desired distributed load arrangement from the exhauster outlet duct 30 to the burners 18 of the furnace 12.

The feed stream of material 42 fed along the exhauster outlet duct 30 must be distributed or allocated to the plurality of burners 18 in a manner which optimally supports the combustion process in the furnace 12. For example, the combustion process in the furnace 12 may be most optimally supported by an equal allocation or loading of the burners 18 with the feed stream of material 42 in other words, the same, or substantially the same, load of the feed stream of material 42, as measured, for example, by mass flow rate, is fed to each burner 18 for injection thereby into the combustion chamber encompassed by the furnace 12. Alternatively, the combustion process in the furnace 12 may be most optimally supported, at a given operational lime period, by an unequal allocation or loading of the burners 18 with a relatively higher load or allocation of the feed stream of material 42 being fed to a selected one or ones of the burner 18 than is fed to others of the burners 18. The material feed apparatus 34 is configurable to support the desired burner loading arrangement such that the feed stream of material 42 conveyed in the exhauster outlet duct 30 is distributed or allocated to the burners 18 in a manner which achieves the desired burner loading. It is to be noted that, in this regard, the material feed apparatus 34 can be alternatively configured as a fixed, non-adjustable device operable to distribute the feed stream of material 42 in accordance with a single, predetermined distribution plan or as an adjustable device which can be adjusted to distribute the feed stream of material 42 in accordance with one distribution plan during one operational period and to distribute the feed stream of material 42 in accordance with another distribution plan different from the one distribution plan during another operational period.

Figure 26:
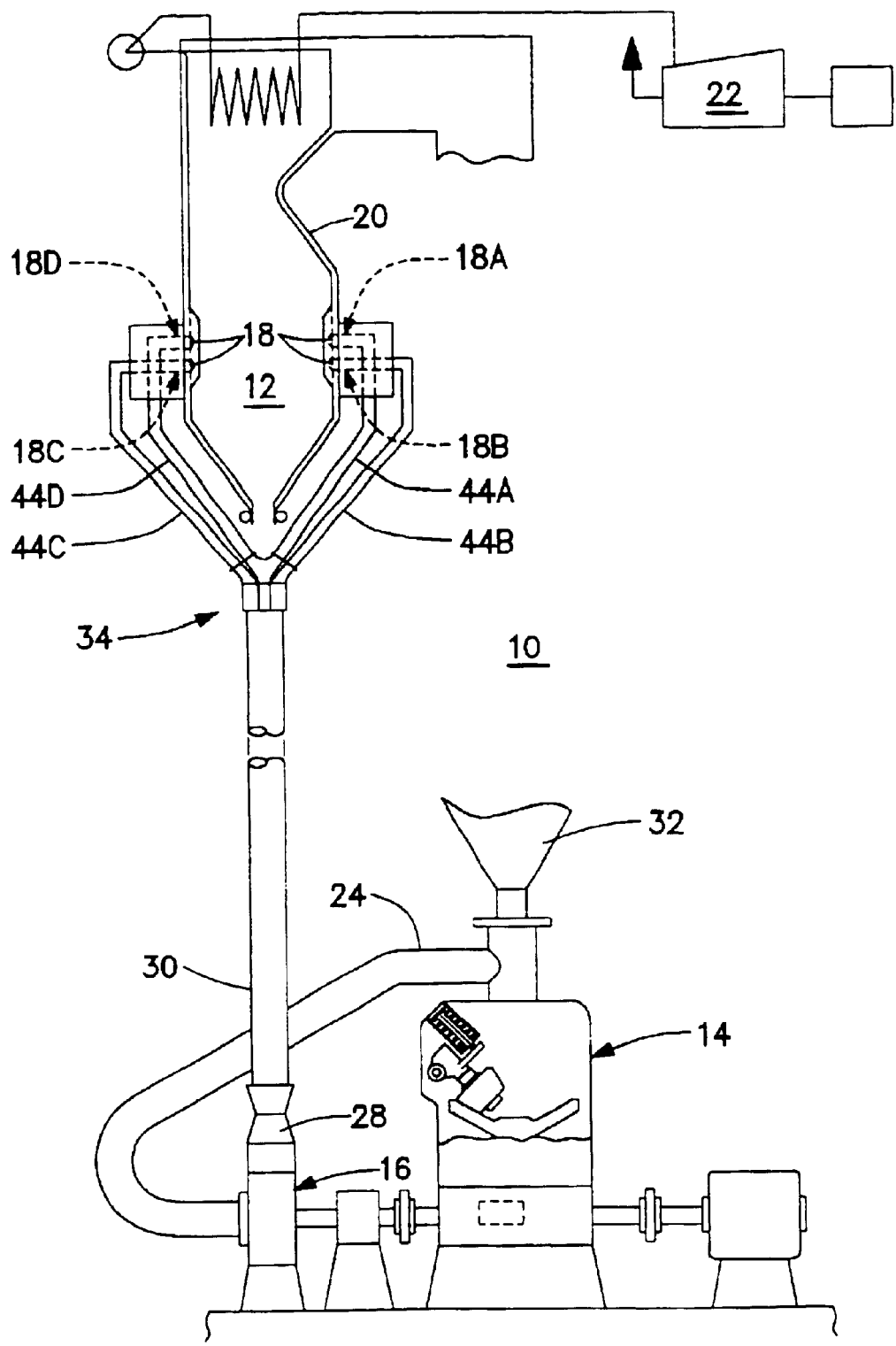
FIG. 26 is a front plan view, in partial section, of a fossil fuel combustion unit having a solid fuel pulverizer and exhauster system and a furnace for combusting a pulverized solid fuel and showing the one embodiment of the material feed apparatus of the present invention in its installed position in line between the solid fuel pulverizer and exhauster system and the furnace.

For the sake of illustrating several exemplary configurations of the material feed apparatus 34, the distribution of the teed stream of material 42 by the material feed apparatus 34 to the burners 18 will be described with respect to a distribution plan in which the feed stream of material 42 is distributed by the material feed apparatus 34 to a total of four (4) discrete ones of the burners 18, it being understood that the material feed apparatus 34 can, as desired, be configured to distribute a feed stream of material to less than four of the burners 18 or, alternately, to more than four of the burners 18. Additionally, the distribution of the feed stream of material 42 can be effected, as the situation warrants, by any suitable arrangement of multiple units of the material feed apparatus 34 operating in parallel or in series. Referring to FIG. 26, it can be seen that the material feed apparatus 34 distributes the feed stream of material 42 to four of the burners 18 hereinafter individually designated as the burner 18A, the burner 18B, the burner 18C, and the burner 18D—by effecting a distribution or allocation of the feed stream of material 42 being conveyed in the exhauster outlet duct 30 to four branch ducts 44A, 44B, 44C, and 44D each separately communicated with a respective one of the burners 18A, 18B, 18C, and 18D for conveying the respective allocated portion of the feed stream of material 42 thereto.

Referring now to FIG. 1, the material feed apparatus 34 includes a manifold plate 46 to which one respective end of each of the branch ducts 44A, 44B, 44C, and 44D is communicated and which is axially spaced from the downstream end 50 of the exhauster outlet duct 30 with respect to a reference axis RA. The material feed apparatus 34 also includes a plenum 48 extending between, and secured to, the downstream open end 50 of the exhauster outlet duct 30 and the manifold plate 46 in an enclosing manner so as to form an enclosed space sealed against the outside between the downstream open end 50 of the exhauster outlet duct 30 and the manifold plate 46.

The material feed apparatus 34 also includes a nozzle 52 in the form of a continuous sleeve with one open end 54 in the shape of a circle having an outside diameter approximately slightly less than the inside diameter of the exhauster outlet duct 30 and tapering radially outwardly from its open end 54 in a flared manner to another open end 56 which has an elliptical shape. The nozzle 52 is supported relative to the exhauster outlet duct 30 by a drive arrangement, to be described shortly hereafter, in a manner such that the open end 54 of the nozzle is disposed slightly axially inwardly of the downstream open end 50 of the exhauster outlet duct 36 and the elliptical open end 56 of the nozzle is disposed slightly axially outwardly of the downstream open end 50 of the exhauster outlet duct 30. The drive arrangement for the nozzle 52 is operable to change the radial position of the elliptical open end 56 of the nozzle relative to the reference axis RA and includes a Y-axis drive assembly 58 in the form of a step motor having a rod 60 which extends through an opening in the exhauster outlet duct 30 and which has a free end connected in a swivel manner to the nozzle 52 and an X-axis drive assembly 62 in the form of a step motor having a rod 64 which extends through an opening in the exhauster outlet duct 30 and which has a free end connected in a swivel manner to the nozzle 52 at a location thereon angularly displace from the swivel connection location of the rod 60 of the Y-axis drive assembly 58 to the nozzle 52.

The elliptical open end 56 of the nozzle 52 forms an upstream passage periphery UPZ (co-extensive with the elliptical open end 56) which bounds an upstream passage through which the feed path 36 passes. The manifold plate 46 includes a plurality of openings each defining a branch entry 66A, 66B, 66C, and 66D for a respective one of the branch ducts 44A, 44B, 44C, and 44D downstream of the upstream passage bounded by the branch entry periphery UPZ. The branch entries 66A, 66B, 66C, and 66D of the branch ducts 44A, 44B, 44C, and 44D, respectively, are all within a common plane which is perpendicular to the reference axis RA. The feed stream of material 42 exiting the downstream open end 50 of the exhauster outlet duct 30 is distributed or allocated by the material feed apparatus 34 such that the material comprising the feed stream of material 42—namely, the pulverized coal 38 and air 36, which has traveled in a non-distributed or non-allocated manner through the upstream passage bounded by the branch entry periphery, is distributed or allocated according to a predetermined distribution plan into respective portions are segregated from one another during their travel in the respective branch ducts 44A, 44B, 44C, and 44D to the burners 18A, 18B, 18C, and 18D. Each portion distributed by the material feed apparatus 34 to a respective branch ducts 44A, 44B, 44C, and 44D comprises air 36 and the pulverized coal 38. The upstream passage periphery UPZ and the common plane in which the branch entries 66A, 66B, 66C, and 66D of the branch ducts 44A, 44B, 44C, and 44D, respectively, are commonly located are at a spacing or stand off distance SOD from one another, as measured parallel to the reference axis RA This stand off distance SOD is selected to take into account the different momentums of the air 36 and the pulverized coal 38, as they pass through the upstream passage periphery UPZ, in a manner which optimizes the distribution of the feed stream of material 42 into the branch ducts 44A, 44B, 44C, and 44D.

Figure 3:
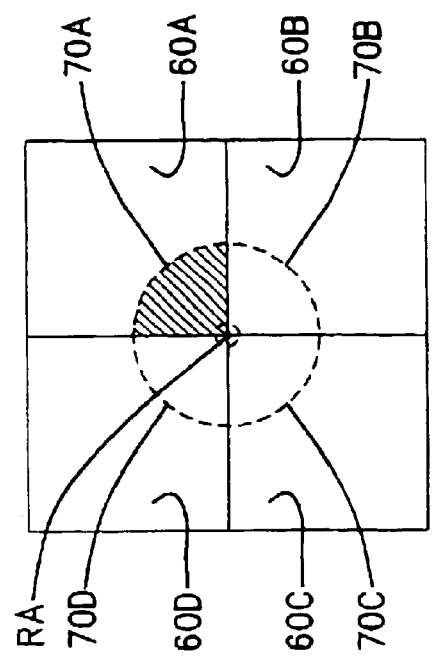
FIG. 3 is a front plan schematic view of the superimposition of the upstream passage periphery on the branch entries formed by the manifold shown in FIG. 2.
Figure 2:
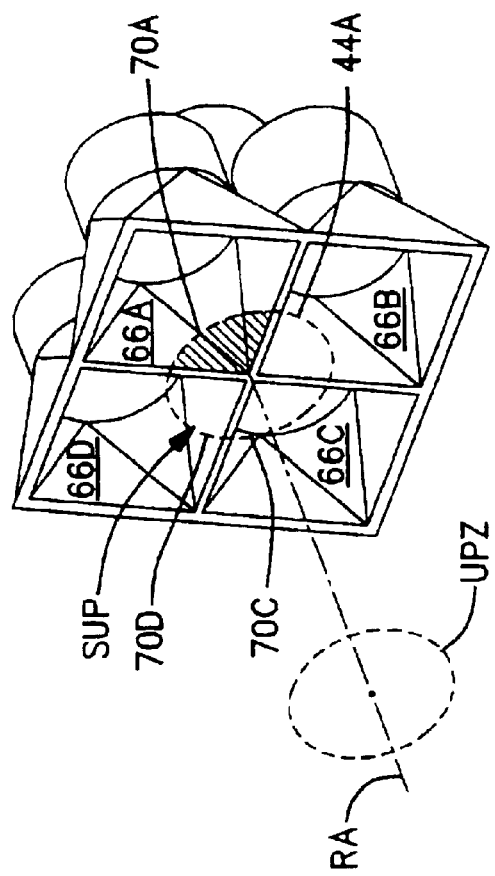
FIG. 2 is a perspective schematic view of the upstream passage periphery in its initial upstream position shown in FIG. 1 and showing the superimposition of the upstream passage periphery on the branch entries formed by the manifold of the one embodiment of the material feed apparatus of the present invention.

The material feed apparatus 34 is thus configured as an apparatus for influencing the travel properties of a material (in the afore-described exemplary material feed scenario, the material is the feed stream of material 42) moving between a material supply source (e.g. the pulverizer 14) and a delivery location (e.g., the furnace 12). The material feed apparatus 34 comprises a means forming a feed path 36 along which the feed stream of material 42 travels as the material is enroute from the material supply source in the form of the pulverizer 14 to the delivery location in the form of the furnace 12. The feed path 36 passes through an upstream passage periphery UPZ each point of which is at a predetermined radial spacing from a reference axis—namely, the reference axis RA. For example, the upstream passage periphery UPZ as seen in FIG. 1 is depicted in FIGS. 2 and 3 as a circle centered on the reference axis RA formed by the open end 54 of the nozzle 52 whereby each point of the upstream passage periphery UPZ is at the same predetermined radial spacing from the reference axis RA—namely, a radial spacing equal to the radius of the open end 54 of the nozzle 52. The feed path 36 includes one branch such as, for example, the branch duct 44A, having a branch entry (e.g., the branch entry 66A of the branch duct 44A) downstream of the upstream passage periphery UPZ, and another branch such as, for example, the branch duct 44C, having a branch entry (e.g., the branch entry 66C of the branch duct 44C) downstream of the upstream passage periphery UPZ. The feed stream of the material 42 traveling through the upstream passage periphery UPZ thereafter separates into at least two portions with one portion of the feed stream of material 42 entering the one branch duct 44A through its branch entry 66A and thereafter traveling along the one branch duct 44A and another portion of the feed stream of material 42 entering the other branch duct 44C through its branch entry 66C and thereafter traveling along this other branch in a manner in which the one portion of the feed stream of material 42 and the other portion of the feed stream of material 42 are segregated from one another during their respective travel along the one branch duct 44A and the other branch 44C.

The material feed apparatus 34 also includes, in the form of the drive arrangement for the nozzle 52 operable to change the radial position of the elliptical open end 56 of the nozzle relative to the reference axis RA comprising the Y-axis drive assembly 58 and the X-axis drive assembly 62, a means for moving at least one of the upstream passage periphery UPZ and the branch entry 66A of the one branch duct 44A relative to the reference axis RA such that the one portion of the feed stream of material 42 and the other portion of the feed stream of material 42, prior to their respective segregated travel along the one branch duct 44A and other branch duct 44C, are comprised in unseparated manner in the stream of the feed stream of material 42 as it travels through the upstream passage periphery UPZ and thereafter travel in segregated manner in their respective branch ducts 44A, 44C with the travel properties of the one portion of the feed stream of material 42 in the one branch duct 44A being different than its travel properties before the movement of the at least one of the upstream passage periphery UPZ and the one branch entry 66A of the branch duct 44A relative to the reference axis RA.

An understanding of how the travel properties of the one portion of the feed stream of material 42 in the one branch duct 44A are different than its travel properties before the movement of the at least one of the upstream passage periphery UPZ and the one branch entry 66A of the branch duct 44A relative to the reference axis RA can be gained from a more detailed description of how the nozzle 52 influences the distribution of the feed stream of material 42 into the branch ducts 44A, 44B, 44C, and 44D. The shape and the radial position of the nozzle 52 influence the distribution of the feed stream of material 42 into the branch ducts 44A, 44B, 44C, and 44D for the reason that the shape of the nozzle 52 influences the radial cross sectional density of the feed stream of material 42 and the radial position of the nozzle 52 influences the vector 68 of the overall path of movement of the feed stream of material as it exits the downstream open end 50 of the exhauster outlet duct 30.

The influence of the radial position of the nozzle 52 on the distribution of the feed stream of material 42 into the branch ducts 44A, 44B, 44C, and 44D can be understood by observing how the superimposition of the upstream passage periphery UPZ on at least one of the branch entries 66A, 66B, 66C, and 66D changes in correspondence with the change in the radial position of the upstream passage periphery UPZ from an initial upstream position during an initial material feed period to a subsequent upstream position during a subsequent material feed period following the initial material feed period. With particular reference to FIGS. 2 and 3, the superimposition of the superimposed upstream passage periphery SUP on the branch entries 66A, 66B, 66C, and 66D is effected by axially translating the upstream passage periphery UPZ along the reference axis RA onto the branch entries 66A, 66B, 66C, and 66D, whereby the axially translated superimposed upstream passage periphery SUP, hereinafter designated as the superimposed upstream passage periphery SUP, delimits the predetermined cross sectional superimposed areas 70A, 70B, 70C, and 70D, respectively, within the branch entries 66A, 66B, 66C, and 66D.

Figure 4:
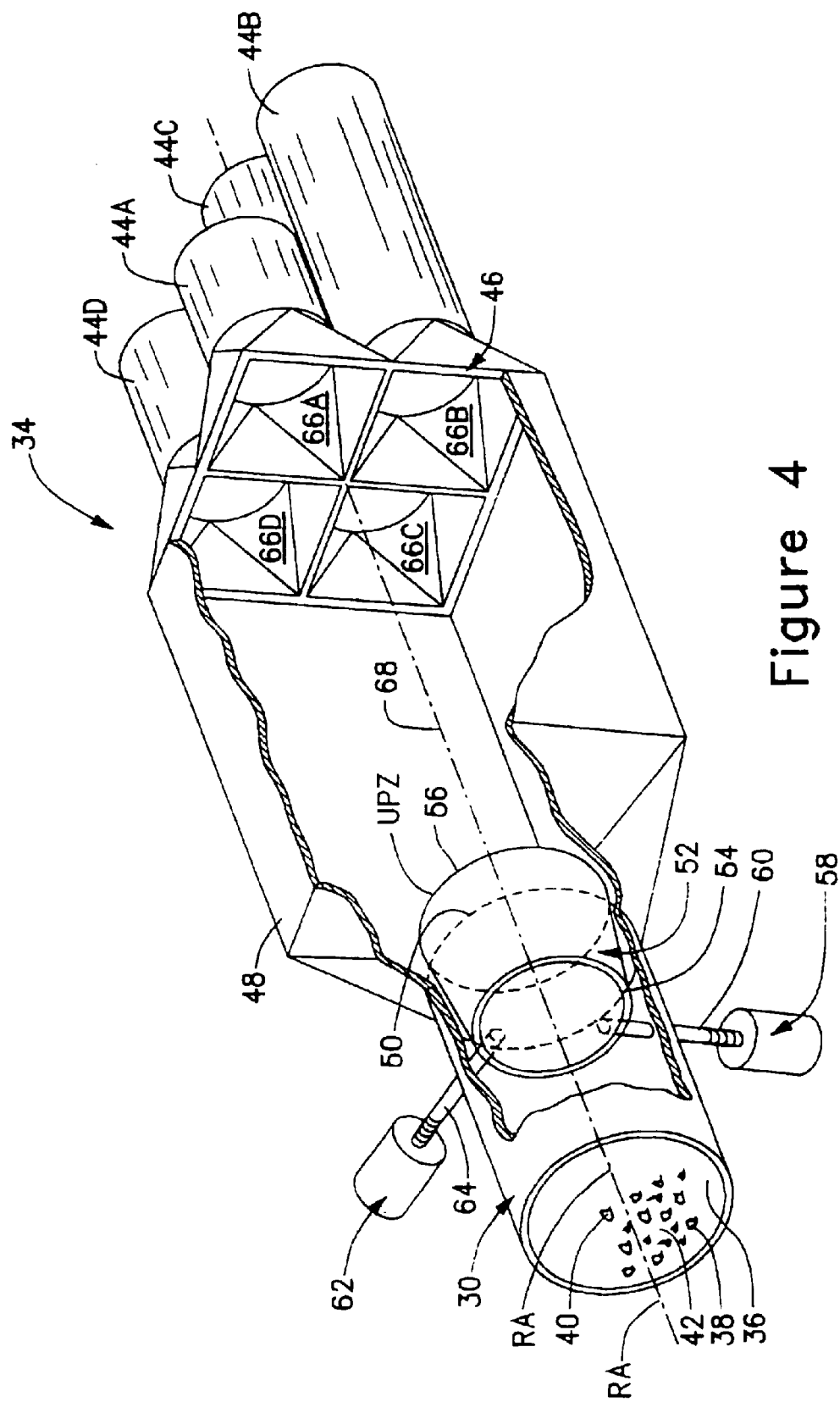
FIG. 4 is an enlarged perspective view, in partial section, of the one embodiment of the material feed apparatus of the present invention shown in its installed position in line between the solid fuel pulverizer and exhauster system and furnace of the fossil fuel combustion unit with the upstream passage periphery thereof in a subsequent upstream position during a subsequent material feed period.
Figure 6:
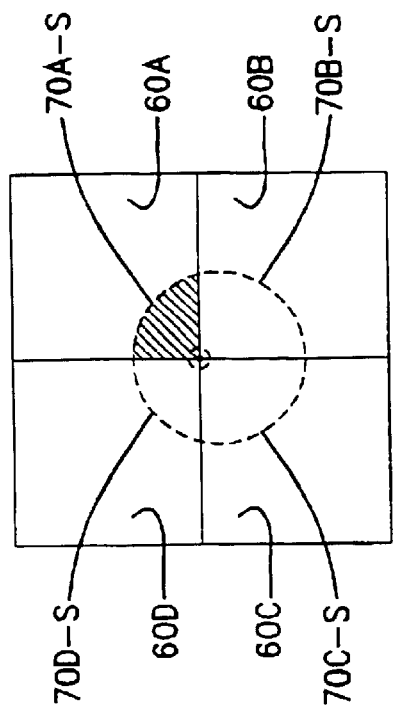
FIG. 6 is a front plan schematic view of the superimposition of the upstream passage periphery on the branch entries formed by the manifold shown in FIG. 5.
Figure 5:
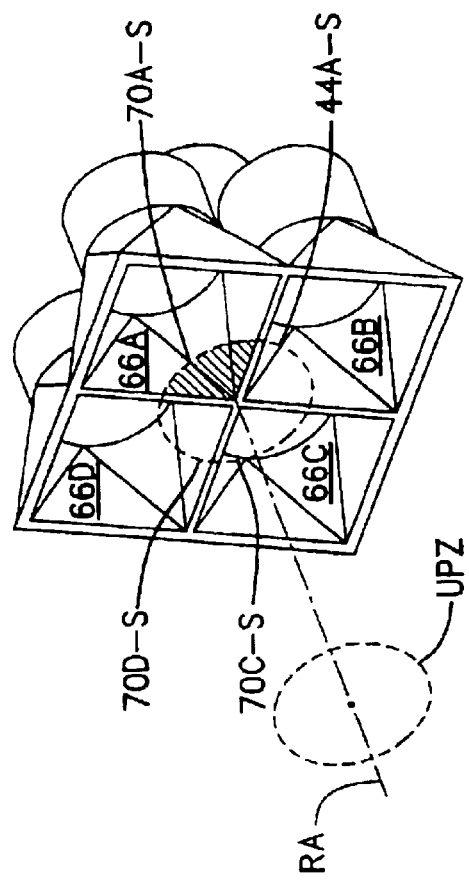
FIG. 5 is a perspective schematic view of the upstream passage periphery in its initial upstream position shown in FIG. 4 and showing the superimposition of the upstream passage periphery on the branch entries formed by the manifold of the one embodiment of the material feed apparatus of the present invention.

The Y-axis drive assembly 58 and the X-axis drive assembly 62 serve as a means for changing the radial position of the upstream passage periphery UPZ relative to the reference axis RA to effect a change in at least one of the superimposed cross sectional area 70A, 70b, 70C, and 70D of the branch entries 66A, 66B, 66C, and 66D delimited by the superimposition of the upstream passage periphery UPZ on the branch entries 66A, 66B, 66C, and 66D. For example, the Y-axis drive assembly 58 and the X-axis drive assembly 62, in serving as the means for changing the radial position of the upstream passage periphery UPZ, are operable to change the radial position of the upstream passage periphery UPZ from its initial upstream position during an initial material feed period, as shown in FIGS. 1–3, to a subsequent upstream position, as shown in FIGS. 4–6, during a subsequent material feed period following the initial material feed period. With reference to FIGS. 1–3, it can be seen that that the superimposition of the upstream passage periphery UPZ on, for example, the branch entry 66A, delimits, during the initial material feed period, an initial superimposed cross sectional area 70A in the branch entry 66A (shown with cross hatching, in FIGS. 2 and 3) and, with reference to FIGS. 4–6, delimits, during the subsequent material feed period, a subsequent superimposed cross sectional area 70A–S in the branch entry 66A (shown in cross hatching in FIGS. 5 and 6) which differs from the initial cross sectional area 70A. The other superimposed cross sectional areas in the branch entries 66B, 66C, and 66D during the subsequent material feed period, designated respectively as the superimposed cross sectional areas 70B–S. 70C–S, and 70D–S, are shown in FIGS. 5 and 6. The subsequent superimposed cross sectional area 70A–S in the branch entry 66A (shown in cross hatching in FIGS. 5 and 6) is different from the initial cross sectional area 70A of the branch entry 66A (shown in cross hatching in FIGS. 2 and 3) in two respects: (1) the subsequent superimposed cross sectional area 70A–S in the branch entry 66A is larger than the initial cross sectional area 70A of the branch entry 66A and (2) the radial position of the subsequent superimposed cross sectional area 70A–S in the branch entry 66A relative to the reference axis RA is different from the radial position of the periphery of the initial cross sectional area 70A. However, it is noted that the present invention contemplates that the subsequent superimposed cross sectional area of a respective branch entry could be the same size as the initial superimposed cross sectional area yet have a different radial position of its periphery, or, alternatively, could be of a smaller size than the initial superimposed cross sectional area and have a different radial position of its periphery.

Referring now to FIGS. 7–12, a further embodiment of the material feed apparatus of the present invention is illustrated. The material feed apparatus 134 in this further embodiment includes, as seen in particular in FIG. 7, a manifold plate 146 to which one respective end of each of the branch ducts 144A, 144B, 144C, and 144D is communicated and which is axially spaced from the downstream end 150 of the exhauster outlet duct 130 with respect to a reference axis RA. The material feed apparatus 134 also includes a plenum 148 extending between, and secured to, the downstream open end 150 of the exhauster outlet duct 130 and the manifold plate 146 in an enclosing manner so as to form an enclosed space sealed against the outside between the downstream open end 150 of the exhauster outlet duct 130 and the manifold plate 146.

The material feed apparatus 134 also includes a nozzle 152 in the form of a continuous sleeve having one open end 154 having a square shape such that a diagonal line between a pair of opposed corners of the square has a length approximately slightly less than the inside diameter of the exhauster outlet duct 130. The nozzle, 152 also has another open end 156 which has a square shape. The nozzle 152 has a flexible square-shaped crease CRN disposed axially intermediate the square-shaped open ends 154 and 156 and perpendicular to the reference axis RA. The nozzle 152 is supported relative to the exhauster outlet duct 130 by a drive arrangement, to be described shortly hereafter, in a manner such that the open end 154 of the nozzle is disposed slightly axially inwardly of the downstream open end 150 of the exhauster outlet duct 130 and the open end 156 of the nozzle is disposed slightly axially outwardly of the downstream open end 150 of the exhauster outlet duct 130. The drive arrangement for the nozzle 152 is operable to change the radial position of the crease CRN of the nozzle relative to the reference axis RA and includes a Y-axis drive assembly 158 in the form of a step motor having a rod 160 which extends through an opening in the exhauster outlet duct 130 and which has a free end connected in a swivel manner to one side of the crease CRN of the nozzle 152 and an X-axis drive assembly 162 in the form of a step motor having a rod 164 which extends through an opening in the exhauster outlet duct 130 and which has a free end connected in a swivel manner to the another side of the crease CRN of the nozzle 152 which is at a right angle to the other, respective side of the crease CRN connected to the Y-drive axis assembly 158.

The open end 156 of the nozzle 152 forms an upstream passage periphery UPZ which bounds an upstream passage through which the feed path 136 passes. The manifold plate 146 includes a plurality of openings each defining a branch entry 166A, 166B, 166C, and 166D for a respective one of the branch ducts 144A, 144B, 144C, and 144D downstream of the upstream passage bounded by the branch entry periphery UPZ. The feed stream of material 142 exiting the downstream open end 150 of the exhauster outlet duct 130 is distributed or allocated by the material feed apparatus 134 such that the material comprising the feed stream of material 142—namely, the pulverized coal 138 and air 140, which has traveled in a non-distributed or non-allocated manner through the upstream passage bounded by the branch entry periphery UPZ, is distributed or allocated according to a predetermined distribution plan into respective portions are segregated from one another during their travel in the respective branch ducts 144A, 144B, 144C, and 144D to the burners 18A, 18B, 18C, and 18D. Each portion distributed by the material feed apparatus 134 to a respective branch ducts 144A, 144B, 144C, and 144D comprises air 140 and the pulverized coal 138.

The shape and the radial position of the nozzle 152 influence the distribution of the feed stream of material 142 into the branch ducts 144A, 144B, 144C, and 144D for the reason that the shape of the nozzle 152 influences the radial cross sectional density of the feed stream of material 142 and the radial position of the nozzle 152 influences the vector 168 of the overall path of movement of the feed stream of material as it exits the downstream open end 150 of the exhauster outlet duct 130. The influence of the radial position of the nozzle 152 on the distribution of the feed stream of material 142 into the branch ducts 144A, 144B, 144C, and 144D can be understood by observing how the superimposition of the upstream passage periphery UPZ on at least one of the branch entries 166A, 166B, 166C, and 166D changes in correspondence with the change in the radial position of the upstream passage periphery UPZ from an initial upstream position during an initial material feed period to a subsequent upstream position during a subsequent material feed period following the initial material feed period. The superimposition of the superimposed upstream passage periphery SUP on the branch entries 166A, 166B, 166C, and 166D is effected by axially translating the upstream passage periphery UPZ along the reference axis RA onto the branch entries 166A, 166B, 166C, and 166D, whereby the axially translated superimposed upstream passage periphery SUP, hereinafter designated as the superimposed upstream passage periphery SUP, delimits the predetermined cross sectional superimposed areas 170A, 170B, 170C, and 170D, respectively, within the branch entries 166A, 166B, 166C, and 166D.

Figure 7:
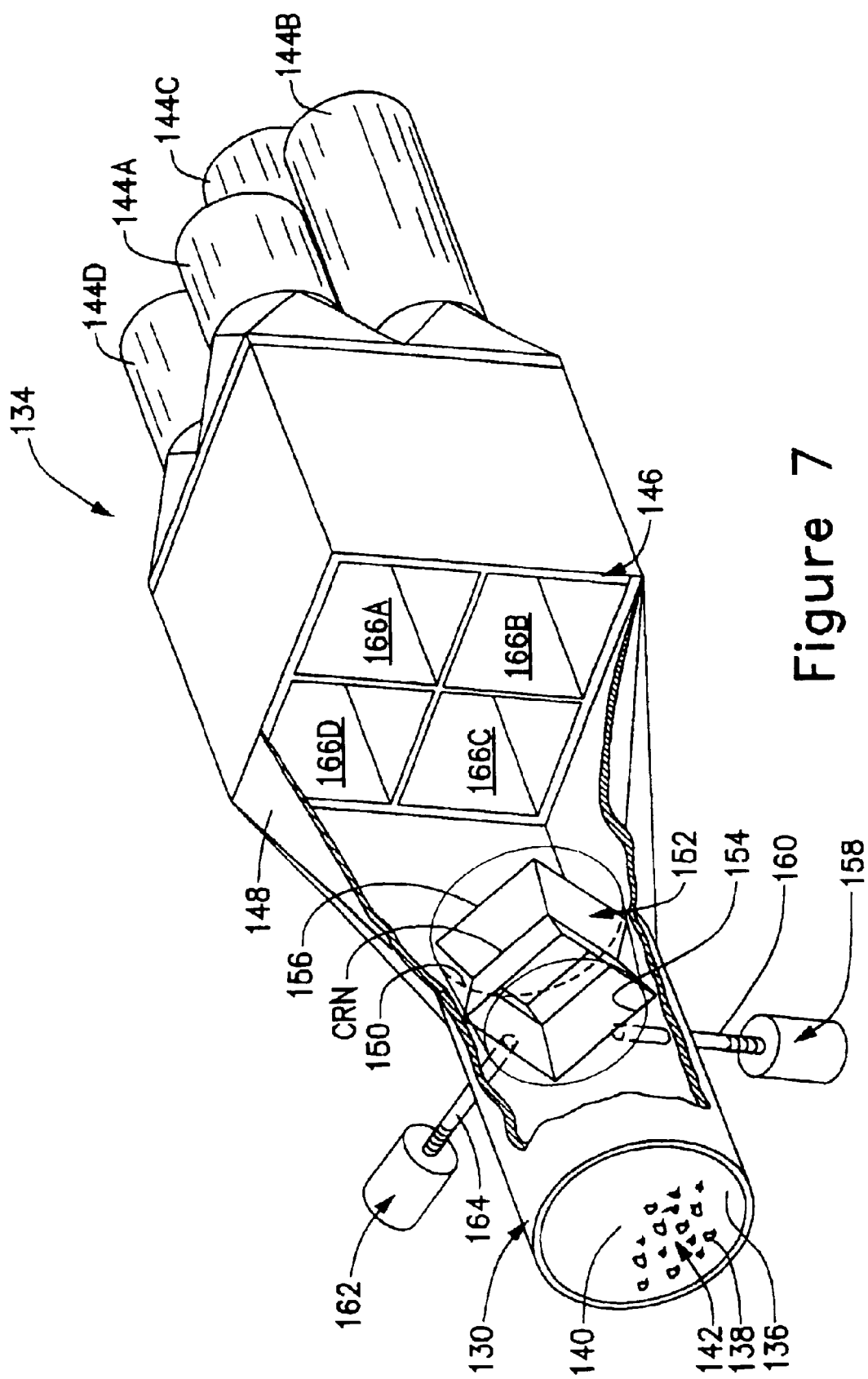
FIG. 7 is an enlarged perspective view, in partial section, of a further embodiment of the material feed apparatus of the present invention shown in its installed position in line between the solid fuel pulverizer and exhauster system and furnace of a fossil fuel combustion unit with the upstream passage periphery thereof in an initial upstream position during an initial material feed period.
Figure 9:
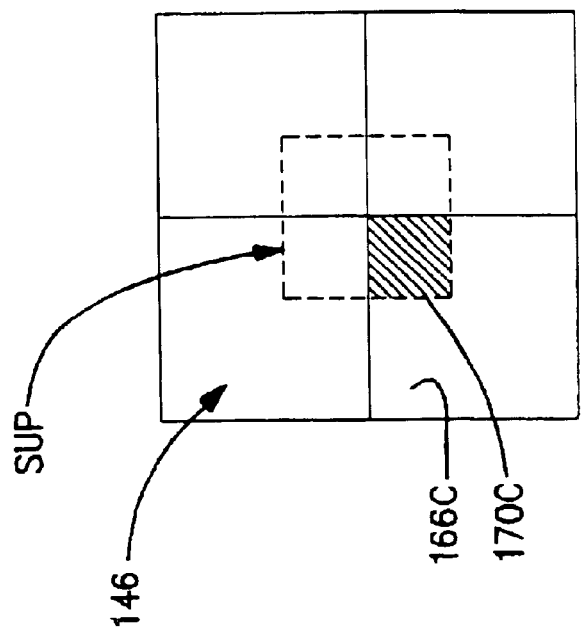
FIG. 9 is a front plan schematic view of the superimposition of the upstream passage periphery on the branch entries formed by the manifold shown in FIG. 8.
Figure 8:
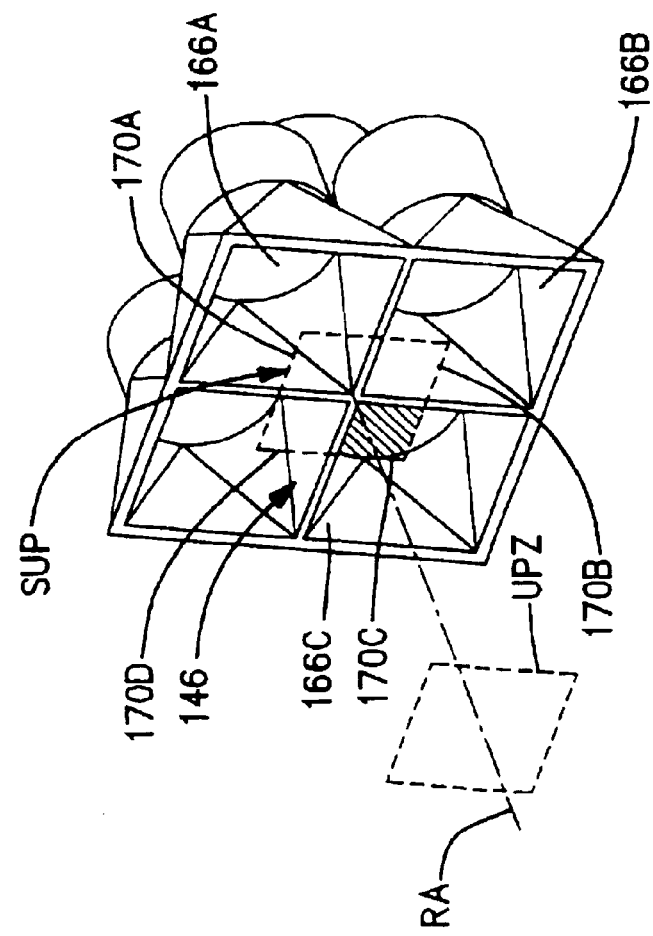
FIG. 8 is a perspective schematic view of the upstream passage periphery in its initial upstream position shown in FIG. 7 and showing the superimposition of the upstream passage periphery on the branch entries formed by the manifold of the further embodiment of the material feed apparatus of the present invention.
Figure 10:
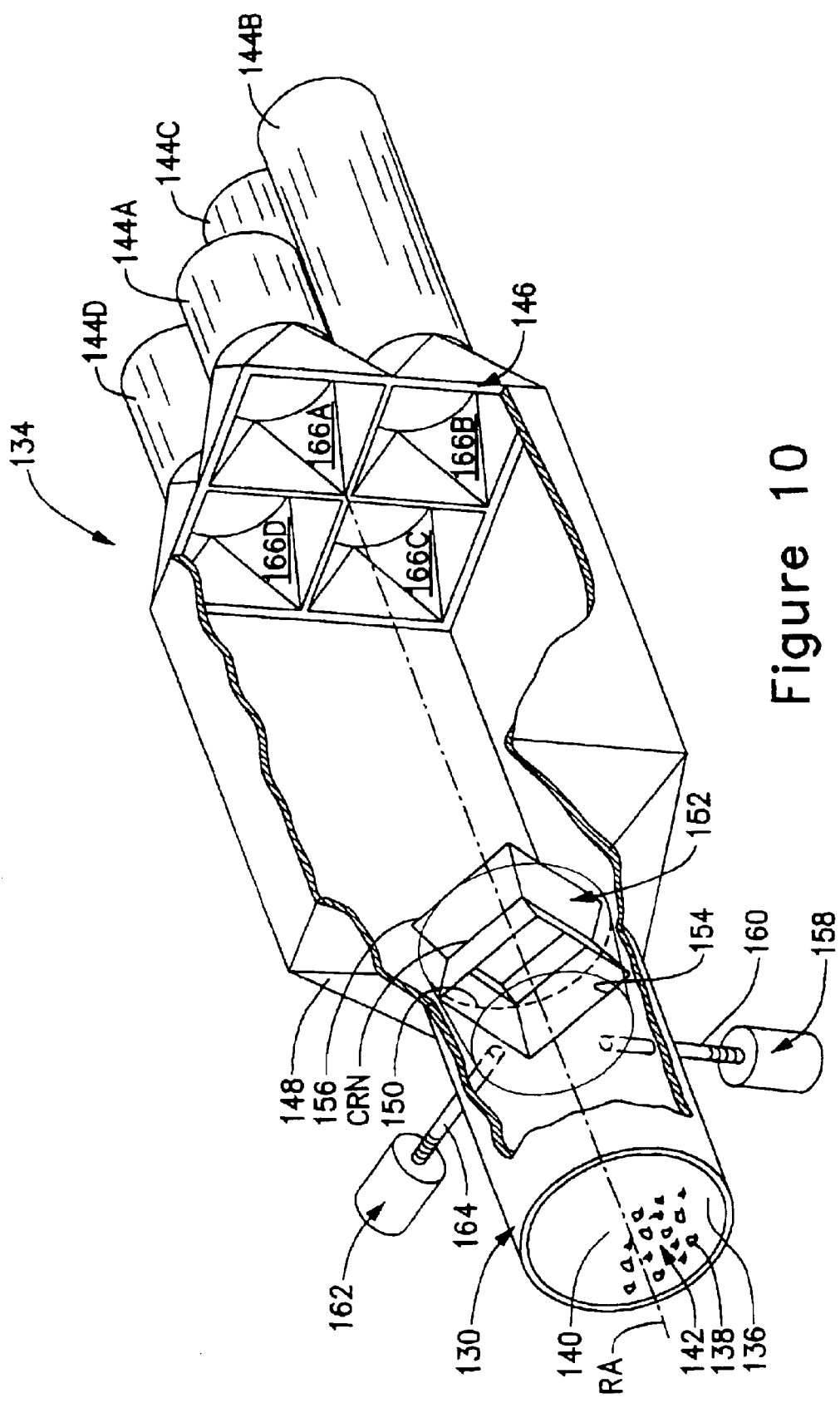
FIG. 10 is an enlarged perspective view, in partial section, of one embodiment of the material feed apparatus of the present invention shown in its installed position in line between the solid fuel pulverizer and exhauster system and furnace of a fossil fuel combustion unit with the upstream passage periphery thereof in a subsequent upstream position during a subsequent material feed period.

The Y-axis drive assembly 158 and the X-axis drive assembly 162 serve as a means for changing the radial position of the upstream passage periphery UPZ relative to the reference axis RA to effect a change in at least one of the superimposed cross sectional area 170A, 170$b$, 170C, and 170D of the branch entries 166A, 166B, 166C, and 166D delimited by the superimposition of the upstream passage periphery UPZ on the branch entries 166A, 166B, 166C, and 166D. For example, the Y-axis drive assembly 158 and the X-axis drive assembly 162, in serving as the means for changing the radial position of the upstream passage periphery UPZ, are operable to change the radial position of the upstream passage periphery UPZ from its initial upstream position during an initial material feed period, as shown in FIGS. 7–9, to a subsequent upstream position, as shown in FIGS. 10–12, during a subsequent material feed period following the initial material feed period. With reference to FIGS. 7–9, it can be seen that that the superimposition of the upstream passage periphery UPZ on, for example, the branch entry 166C, delimits, during the initial material feed period, an initial superimposed cross sectional area 170C in the branch entry 166A (shown with cross hatching in FIGS. 8 and 9) and, with reference to FIGS. 10–12, delimits, during the subsequent material feed period, a subsequent superimposed cross sectional area 170C–S in the branch entry 166C (shown in cross hatching in FIGS. 11 and 12) which differs from the initial cross sectional area 170C. The other superimposed cross sectional areas in the branch entries 166A. 166B, and 166D during the subsequent material feed period, designated respectively as the superimposed cross sectional areas 170A–S, 170B–S, and 170D–S, are shown in FIGS. 11 and 12. The subsequent superimposed cross sectional area 170C–S in the branch entry 166C (shown in cross hatching in FIGS. 11 and 12) is different from the initial cross sectional area 170C of the branch entry 166C (shown in cross hatching in FIGS. 8 and 9) in two respects: (1) the subsequent superimposed cross sectional area 170C–S in the branch entry 166C is smaller than the initial cross sectional area 170C of the branch entry 166C and (2) the radial position of the subsequent superimposed cross sectional area 170C–S in the branch entry 166C relative to the reference axis RA is different from the radial position of the periphery of the initial cross sectional area 170C.

Referring now to FIGS. 13–18, an additional embodiment of the, material feed apparatus of the present invention is illustrated. The material feed apparatus 234 in this additional embodiment includes, as seen in particular in FIG. 13, a manifold plate 246 to which one respective end of each of the branch ducts 244A, 244B, 244C, and 244D is communicated and which is axially spaced from the downstream end 250 of the exhauster outlet duct 230 with respect to a reference axis RA. The material feed apparatus 234 also includes a plenum 248 extending between, and secured to, the downstream open end 250 of the exhauster outlet duct 230 and the manifold plate 246 in an enclosing manner so as to form an enclosed space sealed against the outside between the downstream open end 250 of the exhauster outlet duct 230 and the manifold plate 246.

The material feed apparatus 234 also includes a nozzle 252 in the form of a continuous sleeve having one open end 254 having a square shape such that a diagonal line between a pair of opposed corners of the square has a length approximately slightly less than the inside diameter of the exhauster outlet duct 230. The nozzle 252 also has another open end 256 which has a square shape. The nozzle 252 is supported relative to the exhauster outlet duct 230 by a drive arrangement, to be described shortly, hereafter, in a manner such that the open end 254 of the nozzle is disposed slightly axially inwardly of the downstream open end 250 of the exhauster outlet duct 230 and the open end 256 of the nozzle is disposed slightly axially outwardly of the downstream open end 250 of the exhauster outlet duct 230. The drive arrangement for the nozzle 252 is operable to change the radial position of the open end 256 of the nozzle relative to the reference axis RA and includes a Y-axis drive assembly 258 in the form of a step motor having a rod 260 which extends through an opening in the exhauster outlet duct 230 and which has a free end connected in a swivel manner to the nozzle 252 and an X-axis drive assembly 262 in the form of a step motor having a rod 264 which extends through an opening in the exhauster outlet duct 230 and which has a free end connected in a swivel manner to the nozzle 252 at a location thereon angularly displace from the swivel connection location of the rod 260 of the Y-axis drive assembly 258 to the nozzle 252.

The open end 256 of the nozzle 252 forms an upstream passage periphery UPZ which bounds an upstream passage through which the feed path 236 passes. The manifold plate 246 includes a plurality of openings each defining a branch entry 266A, 266B, 266C, and 266D for a respective one of the branch ducts 244A, 244B, 244C, and 244D downstream of the upstream passage bounded by the branch entry periphery UPZ. The feed stream of material 242 exiting the downstream open end 250 of the exhauster outlet duct 230 is distributed or allocated by the material feed apparatus 234 such that the material comprising the feed stream of material 242—namely, the pulverized coal 238 and air 240, which has traveled in a non-distributed or non-allocated manner through the upstream passage bounded by the branch entry periphery UPZ, is distributed or allocated according to a predetermined distribution plan into respective portions are segregated from one another during their travel in the respective branch ducts 244A, 244B, 244C, and 244D to the burners 18A, 18B, 18C, and 18D. Each portion distributed by the material feed apparatus 234 to a respective branch ducts 244A, 244B, 244C, and 244D comprises air 240 and the pulverized coal 238.

The shape and the radial position of the nozzle 252 influence the distribution of the feed stream of material 242 into the branch ducts 244A, 244B, 244C, and 244D for the reason that the shape of the nozzle 252 influences the radial cross sectional density of the feed stream of material 242 and the radial position of the nozzle 252 influences the vector 268 of the overall path of movement of the feed stream of material as it exits the downstream open end 250 of the exhauster outlet duct 230. The influence of the radial position of the nozzle 252 on the distribution of the feed stream of material 242 into the branch ducts 244A, 244B, 244C, and 244D can be understood by observing how the superimposition of the upstream passage periphery UPZ on at least one of the branch entries 266A, 266B, 266C, and 266D changes in correspondence with the change in the radial position of the upstream passage periphery UPZ from an initial upstream position during an initial material feed period to a subsequent upstream position during a subsequent material feed period following the initial material feed period. The superimposition of the superimposed upstream passage periphery SUP on the branch entries 266A, 266B, 266C, and 266D is effected by axially translating the upstream passage periphery UPZ along the reference axis RA onto the branch entries 266A, 266B, 266C, and 266D, whereby the axially translated superimposed upstream passage periphery SUP, hereinafter designated as the superimposed upstream passage periphery SUP, delimits the predetermined cross sectional superimposed areas 270A, 270B, 270C, and 270D, respectively, within the branch entries 266A, 266B, 266C, and 266D.

Figure 13:
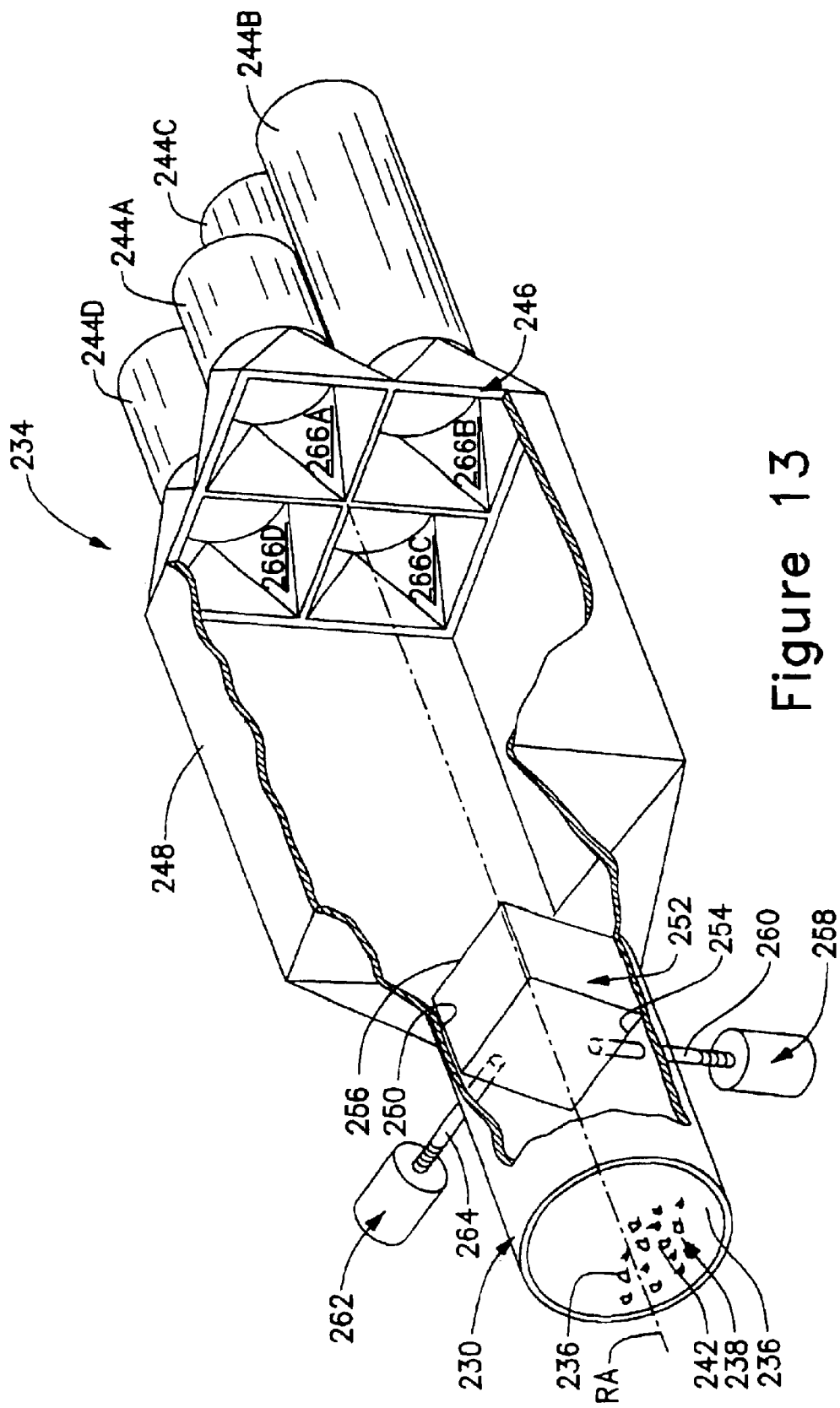
FIG. 13 is an enlarged perspective view, in partial section, of an additional embodiment of the material feed apparatus of the present invention shown in its installed position in line between the solid fuel pulverizer and exhauster system and furnace of a fossil fuel combustion unit with the upstream passage periphery thereof in an initial upstream position during an initial material feed period.
Figure 15:
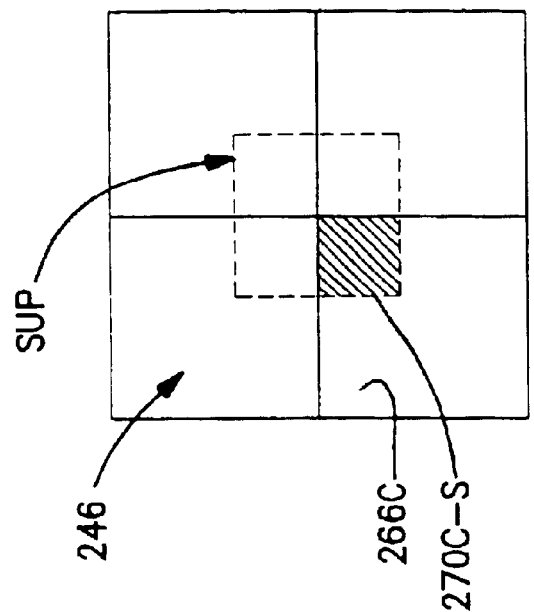
FIG. 15 is a front plan schematic view of the superimposition of the upstream passage periphery on the branch entries formed by the manifold shown in FIG. 14.
Figure 14:
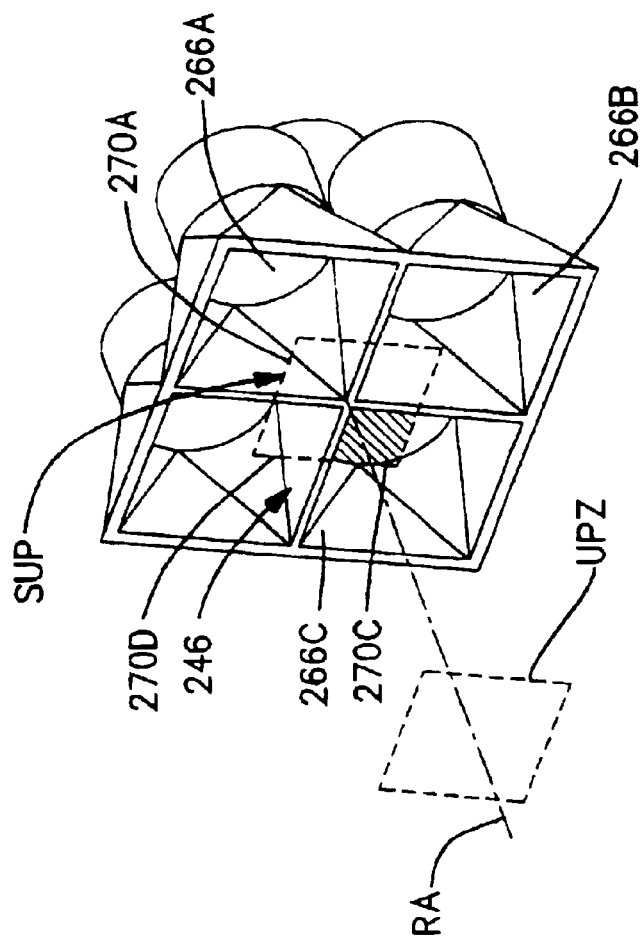
FIG. 14 is a perspective schematic view of the upstream passage periphery in its initial upstream position shown in FIG. 13 and showing the superimposition of the upstream passage periphery on the branch entries formed by the manifold of the additional embodiment of the material feed apparatus of the present invention.
Figure 16:
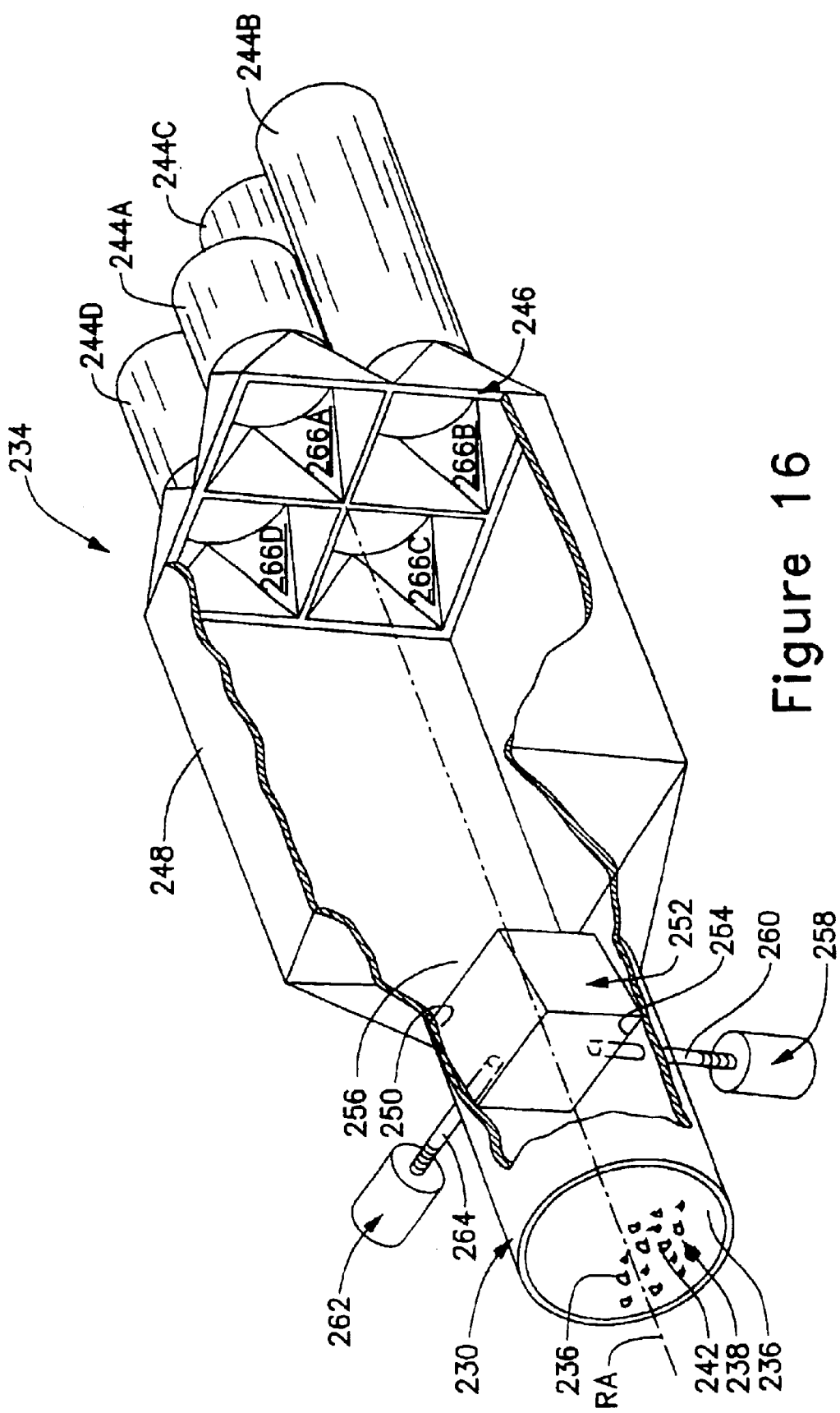
FIG. 16 is an enlarged perspective view, in partial section, of the further embodiment of the material feed apparatus of the present invention shown in its installed position in line between the solid fuel pulverizer and exhauster system and furnace of a fossil fuel combustion unit with the upstream passage periphery thereof in a subsequent upstream position during a subsequent material feed period.
Figure 18:
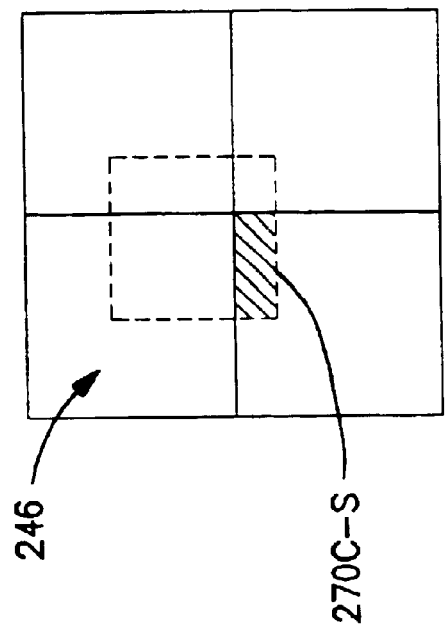
FIG. 18 is a front plan schematic view of the superimposition of the upstream passage periphery on the branch entries formed by the manifold shown in FIG. 17.
Figure 17:
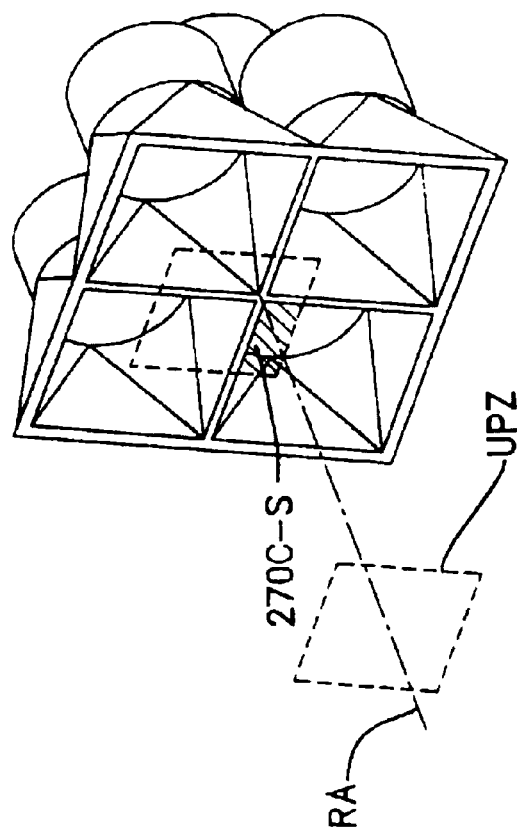
FIG. 17 is a perspective schematic view of the upstream passage periphery in its initial upstream position shown in FIG. 16 and showing the superimposition of the upstream passage periphery on the branch entries formed by the manifold of the additional embodiment of the material feed apparatus of the present invention.

The Y-axis drive assembly 258 and the X-axis drive assembly 262 serve as a means for changing the radial position of the upstream passage periphery UPZ relative to the reference axis RA to effect a change in at least one of the superimposed cross sectional area 270A, 270b, 270C, and 270D of the branch entries 266A, 266B, 266C, and 266D delimited by the superimposition of the upstream passage periphery UPZ on the branch entries 266A, 266B, 266C, and 266D. For example, the Y-axis drive assembly 258 and the X-axis drive assembly 262, in serving as the means for changing the radial position of the upstream passage periphery UPZ, are operable to chance the radial position of the upstream passage periphery UPZ from its initial upstream position during an initial material feed period, as shown in FIGS. 13–15, to a subsequent upstream position, as shown in FIGS. 16–18, during a subsequent material feed period following the initial material feed period. With reference to FIGS. 13–15, it can be seen that that the superimposition of the upstream passage periphery UPZ on, for example, the branch entry 266C, delimits, during the initial material feed period, an initial superimposed cross sectional area 270C in the branch entry 266A (shown with cross hatching in FIGS. 14 and 15) and, with reference to FIGS. 16–18, delimits, during the subsequent material feed period, a subsequent superimposed cross sectional area 270C–S in the branch entry 266C (shown in cross hatching in FIGS. 17 and 18) which differs from the initial cross sectional area 270C. The other superimposed cross sectional areas in the branch entries 266A, 266B, and 266D during the subsequent material feed period, designated respectively as the superimposed cross sectional areas 270A–S, 270B–S, and 270D–S, are shown in FIGS. 17 and 18. The subsequent superimposed cross sectional area 270C–S in the branch entry 266C (shown in cross hatching in FIGS. 17 and 18) is different from the initial cross sectional area 270C of the branch entry 266C (shown in cross hatching in FIGS. 14 and 15) in two respects: (1) the subsequent superimposed cross sectional area 270C–S in the branch entry 266C is smaller than the initial cross sectional area 270C of the branch entry 266C and (2) the radial position of the subsequent superimposed cross sectional area 270C–S in the branch entry 266C relative to the reference axis RA is different from the radial position of the periphery of the initial cross sectional area 270C. Referring now to FIGS. 19–24, yet another embodiment of the material feed apparatus of the present invention is illustrated. The material feed apparatus 334 in this yet another embodiment includes, as seen in particular in FIG. 19, a manifold plate 346 to which one respective end of each of the branch ducts 344A, 344B, 344C, and 344D is communicated and which is axially spaced from the downstream end 350 of the exhauster outlet duct 330 with respect to a reference axis RA. The material feed apparatus 334 also includes a plenum 348 extending between, and secured to, the downstream open end 350 of the exhauster outlet duct 330 and the manifold plate 346 in an enclosing manner so as to form an enclosed space sealed against the outside between the downstream open end 350 of the exhauster outlet duct 330 and the manifold plate 346.

The material feed apparatus 334 also includes a nozzle 352 in the form of a continuous sleeve having one annular open end 354. The nozzle 352 also has another open end 356 which has an elliptical shape. The nozzle 352 is supported relative to the exhauster outlet duct 330 by a drive arrangement, to be described shortly hereafter, in a manner such that the annular open end 354 of the nozzle is disposed slightly axially inwardly of the downstream open end 350 of the exhauster outlet duct 330 and the elliptical open end 356 of the nozzle is disposed slightly axially outwardly of the downstream open end 350 of the exhauster outlet duct 330. The drive arrangement for the nozzle 352 is operable to change the radial position of the elliptical open end 356 of the nozzle relative to the reference axis RA and includes a Y-axis drive assembly 358 in the form of a step motor having a rod 360 which extends through an opening in the exhauster outlet duct 330 and which has a free end connected in a swivel manner to the nozzle 352 and an X-axis drive assembly 362 in the form of a step motor having a rod 364 which extends through an opening in the exhauster outlet duct 330 and which has a free end connected in a swivel manner to the nozzle 352 at a location thereon angularly displace from the swivel connection location of the rod 360 of the Y-axis drive assembly 358 to the nozzle 352.

The elliptical open end 356 of the nozzle 352 forms an upstream passage periphery UPZ which bounds an upstream passage through which the feed path 336 passes. The manifold plate 346 includes a plurality of openings each defining a branch entry 366A, 366B, 366C, and 366D for a respective one of the branch ducts 344A, 344B, 344C, and 344D downstream of the upstream passage bounded by the branch entry periphery UPZ. The feed stream of material 342 exiting the downstream open end 350 of the exhauster outlet duct 330 is distributed or allocated by the material feed apparatus 334 such that the material comprising the feed stream of material 342—namely, the pulverized coal 338 and air 340, which has traveled in a non-distributed or non-allocated manner through the upstream passage bounded by the branch entry periphery UPZ, is distributed or allocated according to a predetermined distribution plan into respective portions are segregated from one another during their travel in the respective branch ducts 344A, 344B, 344C, and 344D to the burners 318A, 318B, 318C, and 318D. Each portion distributed by the material feed apparatus 334 to a respective branch ducts 344A, 344B, 344C, and 344D comprises air 340 and the pulverized coal 338.

The shape and the radial position of the nozzle 352 influence the distribution of the feed stream of material 342 into the branch ducts 344A, 344B, 344C, and 344D for the reason that the shape of the nozzle 352 influences the radial cross sectional density of the feed stream of material 342 and the radial position of the nozzle 352 influences the vector 368 of the overall path of movement of the feed stream of material as it exits the downstream open end 350 of the exhauster outlet duct 330. The influence of the radial position of the nozzle 352 on the distribution of the feed stream of material 342 into the branch ducts 344A, 344B, 344C, and 344D can be understood by observing how the superimposition of the upstream passage periphery UPZ on at least one of the branch entries 366A, 366B, 366C, and 366D changes in correspondence with the change in the radial position of the upstream passage periphery UPZ from an initial upstream position during an initial material feed period to a subsequent upstream position during a subsequent material feed period following the initial material feed period. The superimposition of the superimposed upstream passage periphery SUP on the branch entries 366A, 366B, 366C, and 366D is effected by axially translating the upstream passage periphery UPZ along the reference axis RA onto the branch entries 366A, 366B, 366C, and 366D, whereby the axially translated superimposed upstream passage periphery SUP, hereinafter designated as the superimposed upstream passage periphery SUP, delimits the predetermined cross sectional superimposed areas 370A, 370B, 370C, and 370D, respectively, within the branch entries 366A, 366B, 366C, and 366D.

Figure 19:
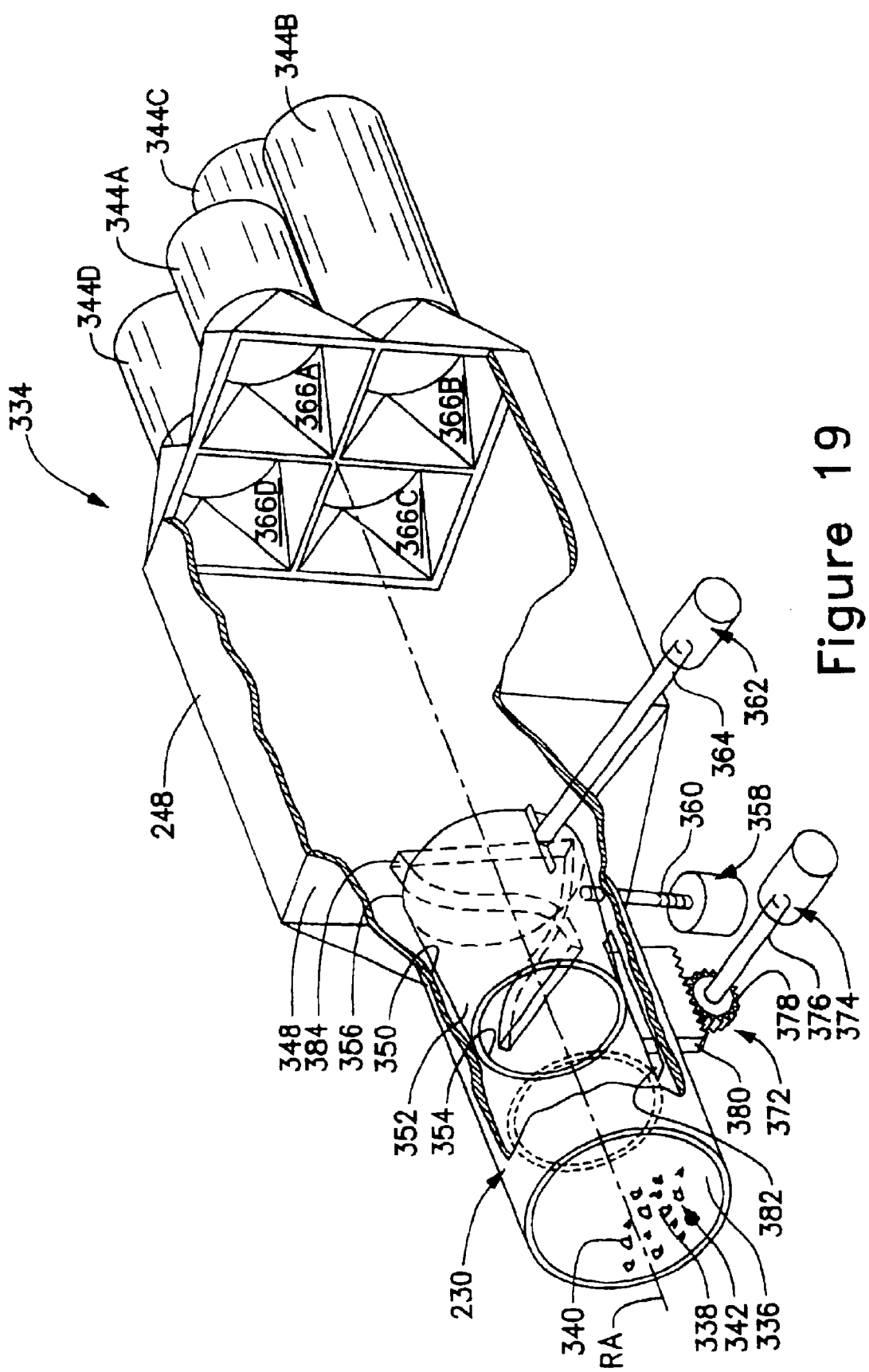
FIG. 19 is an enlarged perspective view, in partial section, of yet another embodiment of the material feed apparatus of the present invention shown in its installed position in line between the solid fuel pulverizer and exhauster system and furnace of a fossil fuel combustion unit with the upstream passage periphery thereof in an initial upstream position during an initial material feed period.
Figure 21:
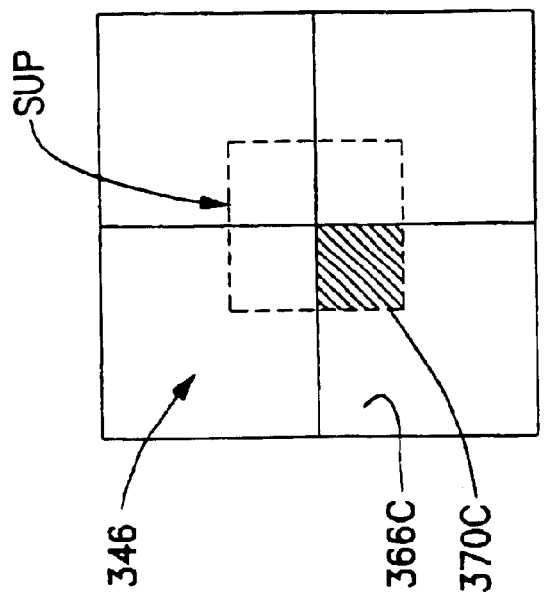
FIG. 21 is a front plan schematic view of the superimposition of the upstream passage periphery on the branch entries formed by the manifold shown in FIG. 20.
Figure 20:
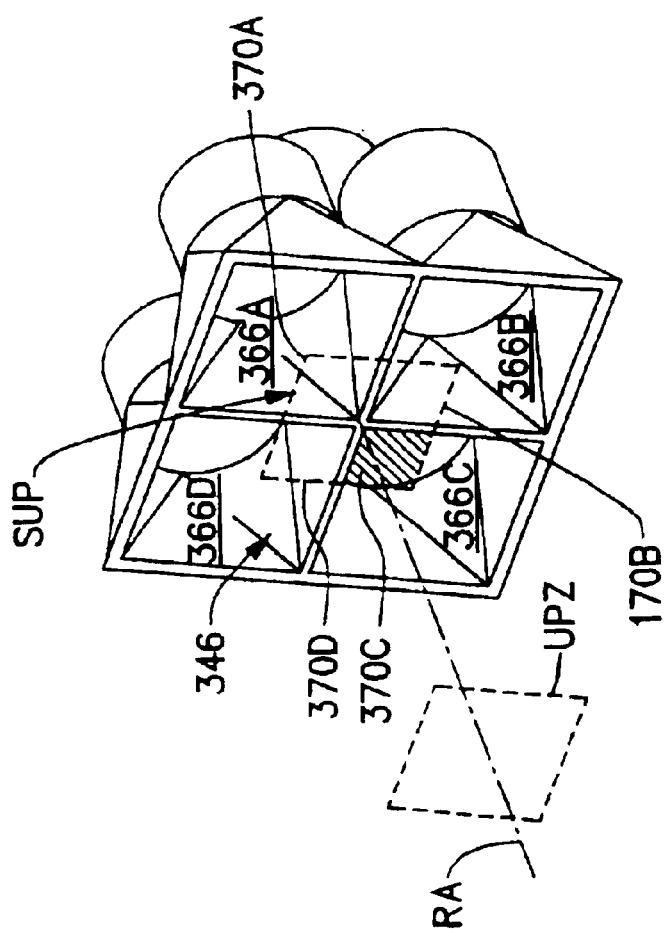
FIG. 20 is a perspective schematic view of the upstream passage periphery in its initial upstream position shown in FIG. 19 and showing the superimposition of the upstream passage periphery on the branch entries formed by the manifold of the vet another embodiment of the material feed apparatus of the present invention.
Figure 22:
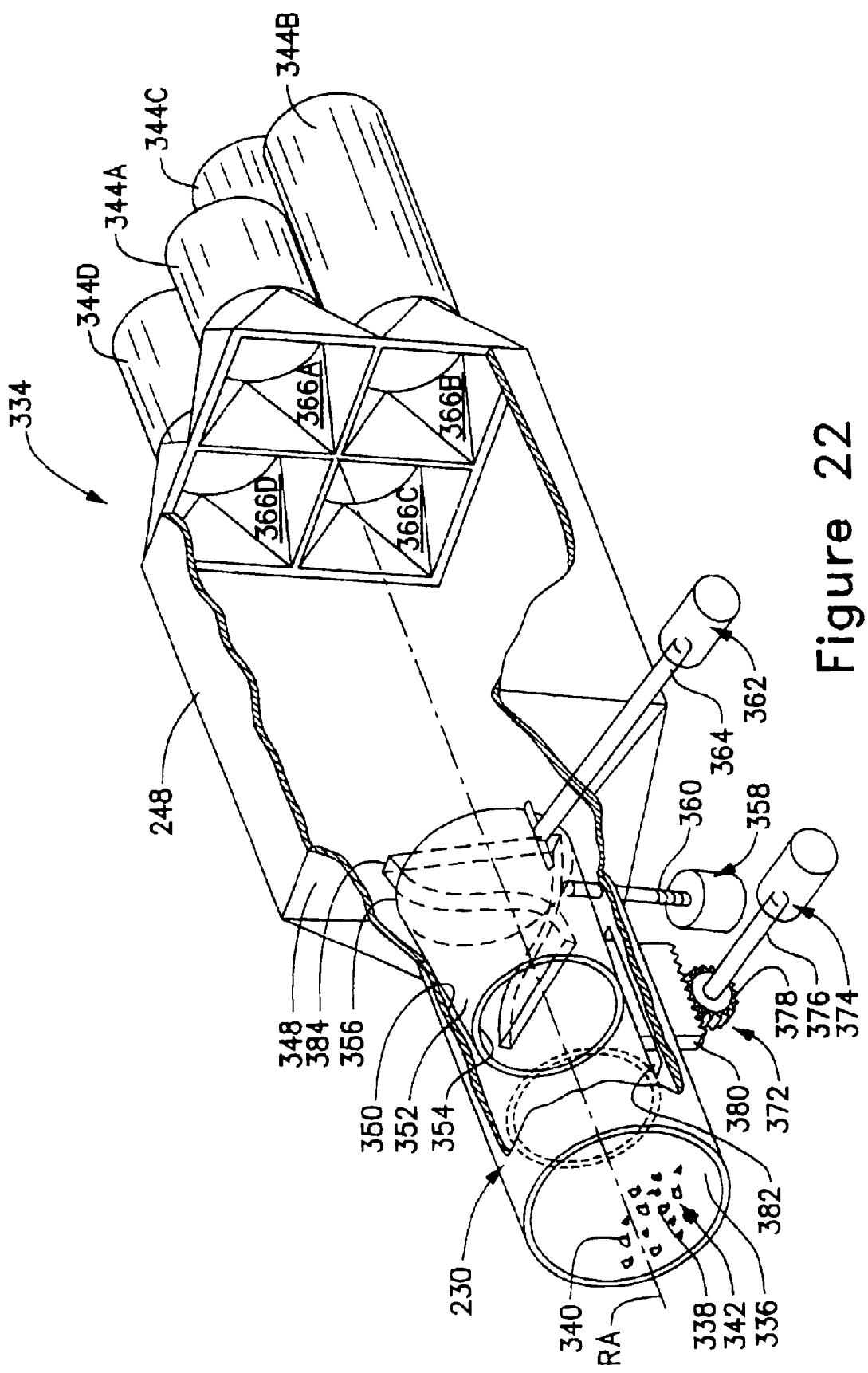
FIG. 22 is an enlarged perspective view, in partial section, of the yet another embodiment of the material feed apparatus of the present invention shown in its installed position in line between the solid fuel pulverizer and exhauster system and furnace of a fossil fuel combustion unit with the upstream passage periphery thereof in a subsequent upstream position during a subsequent material feed period.
Figure 24:
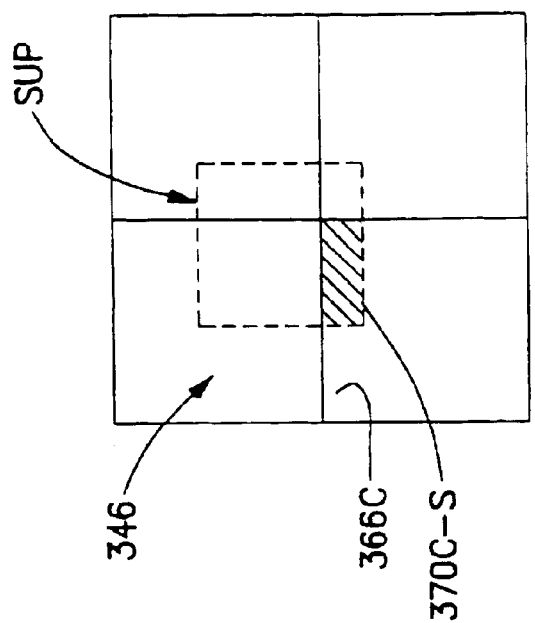
FIG. 24 is a front plan schematic view of the superimposition of the upstream passage periphery on the branch entries formed by the manifold shown in FIG. 23.
Figure 23:
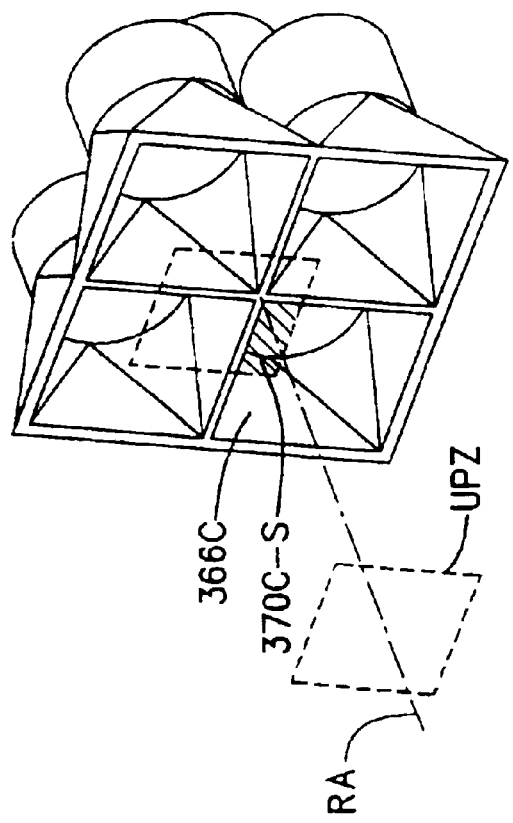
FIG. 23 is a perspective schematic view of the upstream passage periphery in its initial upstream position shown in FIG. 22 and showing the superimposition of the upstream passage periphery on the branch entries formed by the manifold of the yet another embodiment of the material feed apparatus of the present invention.

The Y-axis drive assembly 358 and the X-axis drive assembly 362 serve as a means for changing the radial position of the upstream passage periphery UPZ relative to the reference axis RA to effect a change in at least one of the superimposed cross sectional area 370A, 370b. 370C, and 370D of the branch entries 366A, 366B, 366C, and 366D delimited by the superimposition of the upstream passage periphery UPZ on the branch entries 366A, 366B, 366C, and 366D. For example, the Y-axis drive assembly 358 and the X-axis drive assembly 362, in serving as the means for changing the radial position of the upstream passage periphery UPZ, are operable to change the radial position of the upstream passage periphery UPZ from its initial upstream position during an initial material feed period, as shown in FIGS. 19–21, to a subsequent upstream position, as shown in FIGS. 22–24, during a subsequent material feed period following the initial material feed period. With reference to FIGS. 19–21, it can be seen that that the superimposition of the upstream passage periphery UPZ on, for example, the branch entry 366C, delimits, during the initial material feed period, an initial superimposed cross sectional area 370C in the branch entry 366A (shown with cross hatching in FIGS. 20 and 21) and, with reference to FIGS. 22–24, delimits, during the subsequent material feed period, a subsequent superimposed cross sectional area 370C–S in the branch entry 366C (shown in cross hatching in FIGS. 23 and 24) which differs from the initial cross sectional area 370C. The other superimposed cross sectional areas in the branch entries 366A, 366B, and 366D during the subsequent material feed period, designated respectively as the superimposed cross sectional areas 370A–S. 370B–S, and 370D–S, are shown in FIGS. 23 and 24. The subsequent superimposed cross sectional area 370C–S in the branch entry 366C (shown in cross hatching in FIGS. 23 and 24) is different from the initial cross sectional area 370C of the branch entry 366C (shown in cross hatching in FIGS. 20 and 21) in two respects: (1) the subsequent superimposed cross sectional area 370C–S in the branch, entry 366C is smaller than the initial cross sectional area 370C of the branch entry 366C and (2) the radial position of the subsequent superimposed cross sectional area 370C–S in the branch entry 366C relative to the reference axis RA is different from the radial position of the periphery of the initial cross sectional area 370C.

The material feed apparatus 334 also includes a capability to change the axial position of the upstream passage periphery UPZ relatively along the reference axis RA to effect a change in at least one of the superimposed cross sectional area 370A, 370*b*, 370C, and 370D of the branch entries 366A, 366B, 366C, and 366D delimited by the superimposition of the upstream passage periphery UPZ on the branch entries 366A, 366B, 366C, and 366D. The drive arrangement of the nozzle 352 includes a Z-axis drive assembly 372 in the form of a step motor 374 having a rotating shaft 376. A pinion gear 378 is fixedly secured to the free end of the rotating shaft 376. A rack element 380 is secured to the nozzle 352 and extends through an elongate slot 382 formed in the exhauster outlet duct 330 aligned with the reference axis RA. The portion of the rack element 380 which is external of the exhauster outlet duct 330 has a rack of gear teeth formed thereon which are meshingly engaged by the pinion gear 378 secured to the free end of the rotating shaft 376 of the step motor 374. The step motor 374 is operable to rotate the pinion gear 378 through a selected angular displacement relative to the rotational axis of the rotating shaft 376 to thereby effect, via meshing engagement between the pinion gear 378 and the rack of gear teeth of the rack element 380, movement of the nozzle 352 relatively along the reference axis RA and, thus, relative to the branch entries 366A, 366B, 366C, and 366D.

As seen in FIG. 27, which is an enlarged perspective view, in partial section, of a modification of the yet another embodiment of the material feed apparatus of the present invention shown in FIGS. 19–24, the material feed apparatus also comprises a means for moving the branch entry 366B of the branch duct 344B relative to the reference axis RA. In this modification of the yet another embodiment of the material feed apparatus of the present invention shown in FIGS. 19–24, the branch duct 344B is movable independent of the other branch ducts 344A, 344C, and 344D. The means for moving the branch entry 366B of the branch duct 344B relative to the reference axis RA includes a Z-axis drive assembly 372A in the form of a step motor 374A having a rotating shaft 376A. A pinion gear 378A is fixedly secured to the free end of the rotating shaft 376A. A rack element 380A is secured to the branch duct 344B. The rack element 380A has a rack of gear teeth formed thereon which are meshingly engaged by the pinion gear 378A secured to the free end of the rotating shaft 376A of the step motor 374A. The step motor 374A is operable to rotate the pinion gear 378A through a selected angular displacement relative to the rotational axis of the rotating shaft 376A to thereby effect, via meshing engagement between the pinion gear 378A and the rack of gear teeth of the rack element 380A, movement of the branch duct 344B relatively along the reference axis RA.

Figure 25:
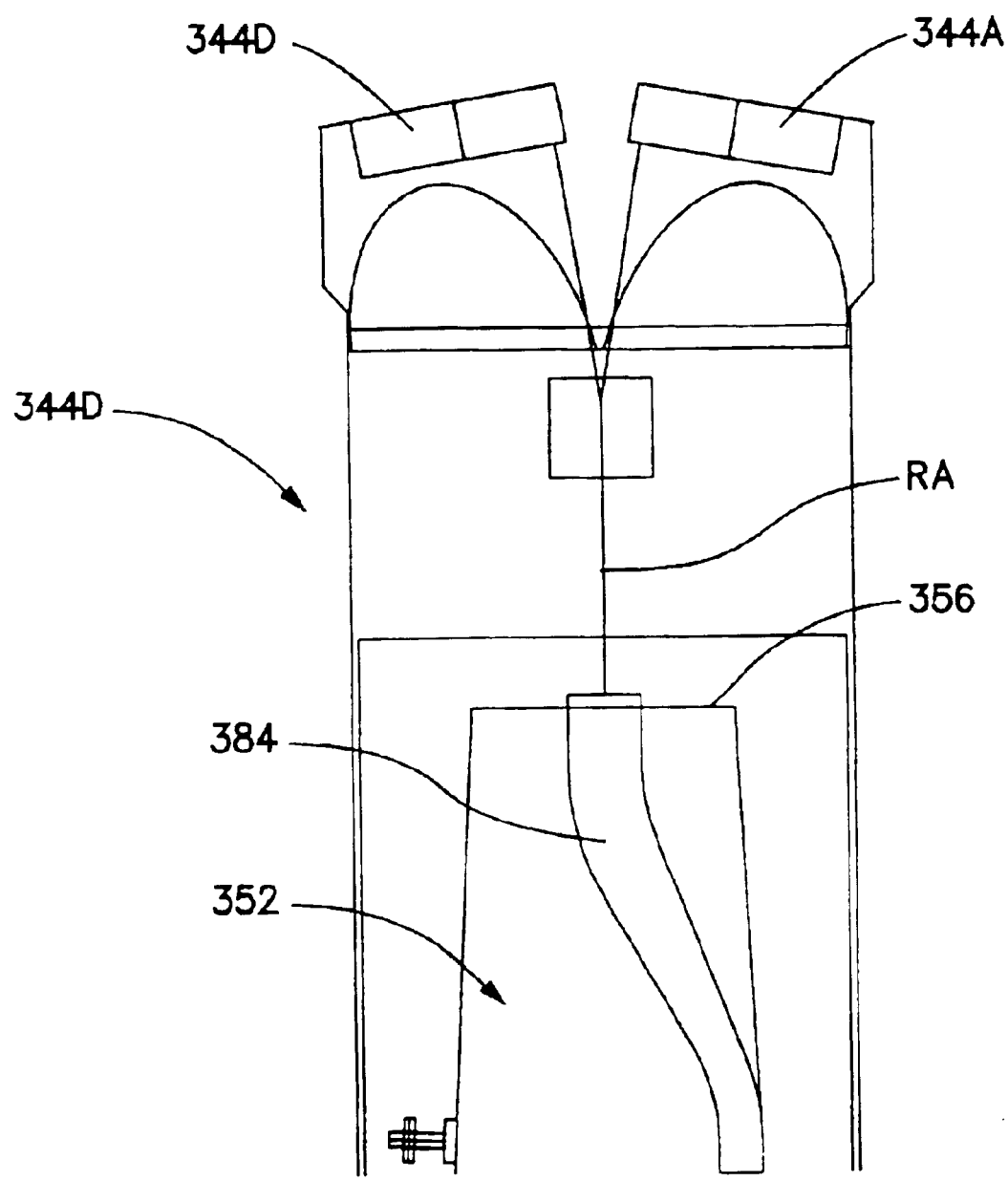
FIG. 25 is a schematic top plan view of a portion of the yet another embodiment of the material feed apparatus of the present invention shown in FIG. 19.

The nozzle 352 also includes, as seen in FIGS. 19 and 25, a vector assist component 384 having a sinuous shape and fixedly secured to the nozzle 352. The vector assist component 384 acts to intercept the material feed apparatus in a static manner so as to guide the material feed apparatus toward a desired arcuate portion of the nozzle 352 such that the material feed apparatus exits the nozzle 352 solely from the desired arcuate portion of the nozzle 352. As seen in FIG. 25, which is a schematic top plan view of a portion of the yet another embodiment of the material feed apparatus of the present invention, the vector assist component 384 has a sinuous shape in that it curves along its longitudinal extent from a portion thereof more closely adjacent to the nozzle 352 at which is at in one arcuate portion of the nozzle radially offset to the reference axis RA on one radial extent of a diametrical line passing through the reference axis RA to another portion thereof more remote from the nozzle 352 which it is in another arcuate portion of the nozzle radially offset to the reference axis RA on the opposite radial extent of the diametrical line passing through the reference axis RA.

The present invention thus provides an apparatus for feeding material between a material supply location and a delivery location which permits more precise and reliable control of the distribution of the material between two or more branch feed paths. Also, the inventive apparatus for feeding material between a material supply location and a delivery location distributes material between two or more branch feed paths in a manner which minimizes any loss of pressure. Moreover, the inventive apparatus for feeding material between a material supply location and a delivery location can distribute a mixture comprised of a fluid transport material and a solid material between two or more branch feed paths in a manner in which the distribution of the fluid transport material between the branch feed paths remains substantially the same following a re-distribution of the entrained solid material between the branch paths. For example, if the mixture being transported comprises air, which, in addition to its combustion support role, also serves as a fluid transport material and, if the mixture being transported comprises as well pulverized coal as the entrained solid material, the distribution of the transport air to the branch paths will remain substantially the same during the subsequent material feed period as it is during the initial material feed period. The capability of the inventive apparatus to achieve the same, or substantially the same, distribution of the transport air to the branch paths during the two different material feed periods (i.e., the initial and subsequent material feed periods) can be enhanced, in connection with the transport of a mixture having both a fluid transport material such as, for example, air, and an entrained material such as, for example, pulverized coal, by configuring the apparatus to take into consideration the different momentums of the fluid transport material and the entrained material. To illustrate how the inventive apparatus can be configured to take into account the different momentums of the various materials comprised in a mixture being transported, reference is had to the one embodiment of the material feed apparatus described with respect to FIGS. 1–6 which is operable to feed a feed stream of material 42 having air 36 as the fluid transport material and pulverized coal 38 as the entrained material. The pulverized coal 38 has a relatively higher momentum than the air 36 as these respective feed stream material components pass beyond the upstream passage periphery UPZ (i.e. as they exit the nozzle 52). Thus, as compared to the air 36, the pulverized coal 38 will tend to travel in a more coherent, less diffuse manner along the direction of the vector 68 of the overall path of movement of the feed stream of material 42 as the feed stream of material 42 passes beyond the upstream periphery passage UPZ. The stand off distance SOD between the upstream passage periphery UPZ and the common plane of branch entries 66A, 66B, 66C, and 66D of the branch ducts 44A, 44B, 44C, and 44D, respectively, can therefore be selected such that the pressure drop in the ducts 44A, 44B, 44C, and 44D is able to influence the air 36, which has relatively less momentum than the pulverized coal 38, to effect a distribution of the air 36 into each of the branch ducts 44A, 44B, 44C, and 44D with the same, or substantially the same, unit mass flow as in the other branch ducts while the pressure drop in the branch ducts 44A, 44B, 44C, and 44D is, nonetheless, not sufficient to divert in any meaningful manner the pulverized coal 38 from its travel in the direction of the vector 68.

While an embodiment and variations of the present invention have been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications which fall within the true spirit and scope of the present invention.

What is claimed is:

1. An apparatus for influencing the travel properties of a material moving between a material supply source and a delivery location, the apparatus comprising:

means forming a feed path along which material travels as the material is enroute from the material supply source to the delivery location, the feed path passing through an upstream passage bounded by an upstream passage periphery formed of a closed loop of points each of which is at a predetermined radial spacing from a reference axis and the feed path including one branch having a branch entry downstream of the upstream passage and another branch having a branch entry downstream of the upstream passage, the stream of material traveling through the upstream passage thereafter separating into at least two portions with one portion of the material entering the one branch through its branch entry and thereafter traveling along the one branch and another portion of the material entering the another branch through its branch entry and thereafter traveling along the another branch in a manner in which the another portion of the material and the one portion of the material are segregated from one another during their respective travel along the one branch and the another branch; and means for moving the upstream passage periphery relative to the reference axis such that the one portion of the material and the another portion of the material, prior to their respective segregated travel along the one branch and the another branch, are comprised in unseparated manner in the stream of material as it travels through the upstream passage and the portions of the material thereafter travel in segregated manner in their respective branches with the travel properties of the one portion of the material in the one branch being different than its travel properties before the movement of the upstream passage periphery relative to the reference axis, the means for relatively moving includes means for axially moving the upstream passage periphery relatively toward and away from the two branch entries.

2. An apparatus for influencing the travel properties of a material moving between a material supply source and a delivery location, the apparatus comprising:

means forming a feed path along which material travels as the material is enroute from the material supply source to the delivery location, the feed path passing through an upstream passage bounded by an upstream passage periphery formed of a closed loop of points each of which is at a predetermined radial spacing from a reference axis and the feed path including one branch having a branch entry downstream of the upstream passage and another branch having a branch entry downstream of the upstream passage, the stream of material traveling through the upstream passage thereafter separating into at least two portions with one portion of the material entering the one branch through its branch entry and thereafter traveling along the one branch and another portion of the material entering the another branch through its branch entry and thereafter traveling along the another branch in a manner in which the another portion of the material and the one portion of the material are segregated from one another during their respective travel along the one branch and the another branch;

means for moving the upstream passage periphery relative to the reference axis such that the one portion of the material and the another portion of the material, prior to their respective segregated travel along the one branch and the another branch, are comprised in unseparated manner in the stream of material as it travels through the upstream passage and the portions of the material thereafter travel in segregated manner in their respective branches with the travel properties of the one portion of the material in the one branch being different than its travel properties before the movement of the upstream passage periphery relative to the reference axis wherein the subsequent superimposed cross sectional area of the one branch entry which is delimited by the superimposition of the upstream passage periphery on the one branch entry is at a different radial position than the initial superimposed cross sectional area of the one branch entry; and means for sensing a predetermined mass flow rate in the one branch and means operatively coupled to the predetermined mass flow rate sensing means and means for axially moving the upstream passage periphery for controlling the axial movement of the upstream passage periphery in response to the sensing of the predetermined mass flow rate by the predetermined mass flow rate sensing means.

3. An apparatus for influencing the travel property of a material moving between a material supply source and a delivery location, the apparatus comprising:

means forming a feed path along which material travels as the material is enroute from the material supply source to the delivery location, the feed path including
   a.) an upstream passage bounded by an upstream passage periphery formed of a closed loop of points each of which is at a predetermined radial spacing from a reference axis,
   b.) one branch having a branch entry downstream of the upstream passage, and
   c.) another branch having a branch entry downstream of the upstream passage, the single stream of material traveling along the feed path passing through the upstream passage and thereafter separating into at least two portions with one portion of the material entering the one branch through its branch entry and thereafter traveling along the one branch and another portion of the material entering the another branch through its branch entry and thereafter traveling along the another branch in a manner in which the another portion of the material and the one portion of the material are segregated from one another during their respective travel along the one branch and the another branch, whereby the one portion of the material and the another portion of the material, prior to their respective segregated travel along the one branch and the another branch, are comprised in unseparated manner in the single stream of material as the single stream of material travels through the upstream passage and the one portion and the another portion of the material thereafter travel in segregated manner from one another in the respective one branch and the another branch as the one portion and the another portion of the material travel downstream of the upstream passage; and means for moving the upstream passage periphery to thereby change a travel property of the one portion of the material in the one branch during continuous separation of the entirety of material in the single stream of material as it travels beyond the upstream passage into, respectively, the one portion and the another portion of material, the travel property changing means being operable to move the upstream passage periphery relative to the reference axis such that the travel property of the one portion of the material in the one branch after such movement relative to the reference axis is different than the same travel property of the one portion of the material in the one branch before such movement relative to the reference axis.

4. An apparatus for influencing the travel property of a material according to claim 3 wherein a superimposition of the upstream passage periphery on the one branch entry effected by axially translating the upstream passage periphery along the reference axis onto the one branch entry delimits a predetermined cross sectional superimposed area of the one branch entry and the means for changing a travel property of the one portion of the material in the one branch is operable to change the radial position of the upstream passage periphery relative to the reference axis to effect a change in the superimposed cross sectional area of the one branch entry delimited by the superimposition of the upstream passage periphery on the one branch entry from an initial upstream position during an initial material feed period to a subsequent upstream position during a subsequent material feed period following the initial material feed period, whereby the superimposition of the upstream passage periphery on the one branch entry delimits, during the initial material feed period, an initial superimposed cross sectional area of the one branch entry and delimits, during the subsequent material feed period, a subsequent superimposed cross sectional area of the one branch entry which differs from the initial cross sectional area.

5. An apparatus for influencing the travel property of a material according to claim 4 wherein the means for changing a travel property of the one portion of the material in the one branch is operable to effect the superimposition of the upstream passage periphery on the one branch entry such that the subsequent superimposed cross sectional area of the one branch entry which is delimited by the superimposition of the upstream passage periphery on the one branch entry is smaller than the initial superimposed cross sectional area of the one branch entry.

6. An apparatus for influencing the travel property of a material according to claim 4 wherein the means for changing a travel property of the one portion of the material in the one branch is operable to effect the superimposition of the upstream passage periphery on the one branch entry such that the subsequent superimposed cross sectional area of the one branch entry which is delimited by the superimposition of the upstream passage periphery on the one branch entry is larger than the initial superimposed cross sectional area of the one branch entry.

7. An apparatus for influencing the travel property of a material according to claim 4 wherein the means for changing a travel property of the one portion of the material in the one branch is operable to effect the superimposition of the upstream passage periphery on the one branch entry such that the subsequent superimposed cross sectional area of the one branch entry which is delimited by the superimposition of the upstream passage periphery on the one branch entry is at a different radial position than the initial superimposed cross sectional area of the one branch entry.

8. An apparatus for influencing the travel property of a material according to claim 3 wherein the means for changing a travel property of the one portion of the material in the one branch is operable to axially move the upstream passage periphery relatively toward and away from the two branch entries.

9. An apparatus for influencing the travel property of a material according to claim 7 and further comprising means for sensing a predetermined mass flow rate in the one branch and means operatively coupled to the predetermined mass flow rate sensing means and means for axially moving the upstream passage periphery for controlling the axial movement of the upstream passage periphery in response to the sensing of the predetermined mass flow rate by the predetermined mass flow rate sensing means.

10. An apparatus for influencing the travel property of a material according to claim 4 wherein the means for changing a travel property of the one portion of the material in the one branch is operable to change the volume of the one portion of the material traveling in the one branch entry.

11. An apparatus for influencing the travel property of a material according to claim 3 wherein the means forming a feed path includes a vector assist component for guiding material, the vector assist component having a longitudinal extent and being configured in a sinuous shape in which the vector assist component curves along its longitudinal extent from a portion thereof more closely adjacent to the upstream passage at which the vector assist component is in one portion of the upstream passage radially offset to the reference axis on one radial extent of a diametrical line passing through the reference axis to another portion thereof more remote from the upstream passage at which the vector assist component is in another portion of the upstream passage radially offset to the reference axis on the opposite radial extent of the diametrical line passing through the reference axis.

* * * * *